United States Patent
Bezos

(10) Patent No.: US 8,788,977 B2
(45) Date of Patent: Jul. 22, 2014

(54) MOVEMENT RECOGNITION AS INPUT MECHANISM

(75) Inventor: Jeffrey P. Bezos, Greater Seattle Area, WA (US)

(73) Assignee: Amazon Technologies, Inc., Reno, NV (US)

(*) Notice: Subject to any disclaimer, the term of this patent is extended or adjusted under 35 U.S.C. 154(b) by 702 days.

(21) Appl. No.: 12/332,049

(22) Filed: Dec. 10, 2008

(65) Prior Publication Data

US 2010/0125816 A1 May 20, 2010

Related U.S. Application Data

(60) Provisional application No. 61/116,430, filed on Nov. 20, 2008.

(51) Int. Cl.
*G06F 3/048* (2013.01)

(52) U.S. Cl.
USPC .......................................... 715/863; 715/773

(58) Field of Classification Search
USPC .......................................................... 715/863
See application file for complete search history.

(56) References Cited

U.S. PATENT DOCUMENTS

| | | | |
|---|---|---|---|
| 5,563,988 A | 10/1996 | Maes et al. | |
| 5,616,075 A | 4/1997 | Oh et al. | |
| 6,272,231 B1* | 8/2001 | Maurer et al. | 382/103 |
| 6,385,331 B2 | 5/2002 | Harakawa et al. | |
| 6,434,255 B1 | 8/2002 | Harakawa | |
| 6,750,848 B1 | 6/2004 | Pryor | |
| 6,863,609 B2 | 3/2005 | Okuda et al. | |
| 7,301,526 B2* | 11/2007 | Marvit et al. | 345/156 |
| 7,379,566 B2* | 5/2008 | Hildreth | 382/107 |
| 7,401,783 B2 | 7/2008 | Pryor | |
| 7,519,223 B2 | 4/2009 | Dehlin et al. | |

(Continued)

FOREIGN PATENT DOCUMENTS

| | | |
|---|---|---|
| CN | 1694045 A | 11/2005 |
| JP | 2002-164990 | 6/2002 |

(Continued)

OTHER PUBLICATIONS

Haro, Antonio et al, Mobile Camera-Based Adaptive Viewing, 2005, MUM '05 Proceedings of the 4th International Conference on Mobile and Ubiquitous Mulitmedia.*

(Continued)

*Primary Examiner* — Matt Kim
*Assistant Examiner* — William Trapanese
(74) *Attorney, Agent, or Firm* — Novak Druce Connolly Bove + Quigg LLP

(57) ABSTRACT

The detection of relative motion or orientation between a user and a computing device can be used to control aspects of the device. For example, the computing device can include an imaging element and software for locating positions, shapes, separations, and/or other aspects of a user's facial features relative to the device, such that an orientation of the device relative to the user can be determined. A user then can provide input to the device by performing actions such as tilting the device, moving the user's head, making a facial expression, or otherwise altering an orientation of at least one aspect of the user with respect to the device. Such an approach can be used in addition to, or as an alternative to, conventional input devices such as keypads and touch screens.

39 Claims, 20 Drawing Sheets

(56) References Cited

U.S. PATENT DOCUMENTS

| | | | |
|---|---|---|---|
| 2002/0071277 | A1 | 6/2002 | Starner et al. |
| 2004/0140956 | A1* | 7/2004 | Kushler et al. ............... 345/168 |
| 2007/0164989 | A1* | 7/2007 | Rochford et al. ............ 345/156 |
| 2008/0005418 | A1 | 1/2008 | Julian |
| 2008/0013826 | A1 | 1/2008 | Hillis et al. |
| 2008/0019589 | A1 | 1/2008 | Yoon et al. |
| 2008/0040692 | A1* | 2/2008 | Sunday et al. ............... 715/863 |
| 2008/0136916 | A1 | 6/2008 | Wolff |
| 2008/0158096 | A1 | 7/2008 | Breed |
| 2008/0174570 | A1 | 7/2008 | Jobs et al. |
| 2008/0266530 | A1 | 10/2008 | Takahashi et al. |
| 2008/0276196 | A1 | 11/2008 | Tang |
| 2009/0031240 | A1* | 1/2009 | Hildreth ........................ 715/772 |
| 2009/0079813 | A1* | 3/2009 | Hildreth .................... 348/14.03 |
| 2009/0265627 | A1* | 10/2009 | Kim et al. .................... 715/702 |
| 2009/0313584 | A1* | 12/2009 | Kerr et al. .................... 715/849 |

FOREIGN PATENT DOCUMENTS

| | | |
|---|---|---|
| JP | 2002-351603 | 12/2002 |
| JP | 2004-318826 | 11/2004 |
| JP | 2007-121489 | 5/2007 |
| JP | 2008-97220 | 4/2008 |
| WO | WO 02/15560 A2 | 2/2002 |
| WO | WO 02/15560 A3 | 2/2002 |
| WO | WO 2006036069 A1 * | 4/2006 |

OTHER PUBLICATIONS

Nokia N95 8GB Data Sheet, 2007, Nokia.*

Brashear, H. et al., "Using Multiple sensors for Mobile Sign Language Recognition," *International Symposium on Wearable Computers,* Oct. 2003, 8 pages.

Consumerreports.org., "Face detection, Technology puts portraits in focus," located at <http://www.comsumerreports.org/crofelectronics-computers/camera-photograph/cameras-c . . . , Nov. 2007, last accessed on Feb. 6, 2009, 1 page.

Nintendo Games, "Introducing the Wii MotionPlus, Nintendo's upcoming accessory for the revolutionary Wii Remote at Nintendo:: What's New," located at http://www.nintendo.com/whatsnew/detail/aMMuRj_N6vntHPDycCJAKWhEO9zBvyPH>, Jul. 14, 2008, last accessed on Feb. 6, 2009, 2 pages.

Padilla, R., "Eye Toy," located at <http://www.archive.gamespy.com/hardware/august03/eyetoyps2/index.shtml>, Aug. 16, 2003, last accessed on Feb. 6, 2009, 2 pages.

Schneider, J., "Does Face Detection Technology Really Work? Can the hottest new digital camera feature of 2007 actually improve your people pictures? Here's the surprising answer!" located at <http://www.adorama.com/catalog.tpl?article=052107&op=academy_new>, May 21, 2007, last accessed on Feb. 6, 2009, 5 pages.

Tyser, P., "Control an iPod with gestures," located at <http://www.videsignline.com/howto/170702555>, Sep. 11, 2005, last accessed on Feb. 6, 2009, 4 pages.

Zyga, L., "PHYSorg.com, Hacking the Wii remote for physics class," located at <http://www.physorg.com/news104502773.html>, Jul. 24, 2007, last accessed on Feb. 6, 2009, 2 pages.

International Search Report mailed on Apr. 7, 2010, for International Application No. PCT/US09/65364 filed on Nov. 20, 2009, 2 pages.

Cornell, J., "Does This Headline Know You're Reading It?" *h+ Magazine,* Mar. 19, 2010, located at <http://hplusmagazine.com/articles/ai/does-headline-know-you%E2%80%99re-reading-its>, last accessed on Jun. 7, 2010, 4 pages.

Canadian Office Action dated May 13, 2013, Canadian Application No. 2,743,914, May 13, 2013, 2 pages.

First Office Action dated Mar. 22, 2013, Chinese Application No. 200980146841.0, Mar. 22, 2013, 40 pages.

International Written Opinion dated Apr. 7, 2010, International Application PCT/US09/65364, Apr. 7, 2010, 7 pages.

Non Final Office Action dated Dec. 21, 2012, Korean Application No. 10-2011-7013875, Dec. 21, 2012, 3 pages.

Non Final Office Action dated Apr. 2, 2013, Japanese Application No. 2011-537661, Apr. 2, 2013, 2 pages.

* cited by examiner

800

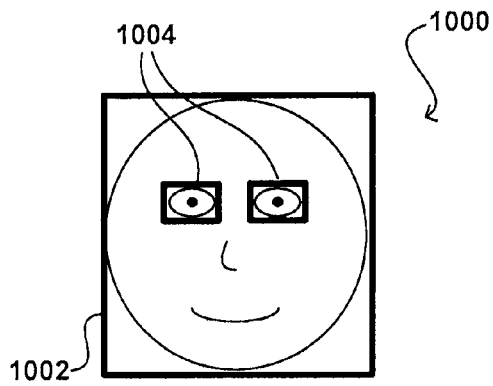
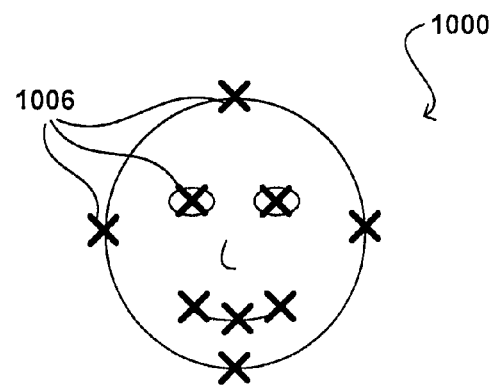
FIG. 10(a)  FIG. 10(b)
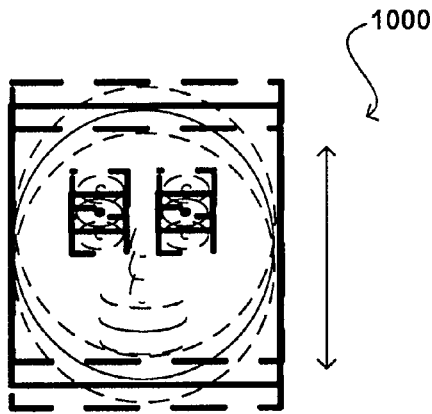
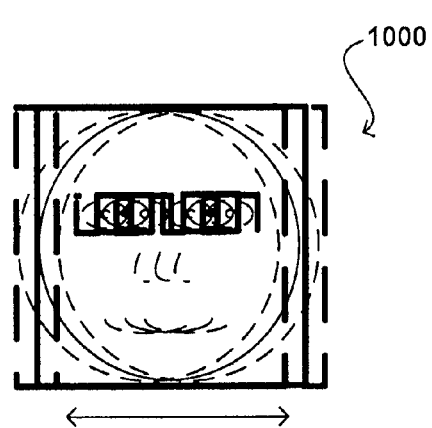
FIG. 10(c)  FIG. 10(d)
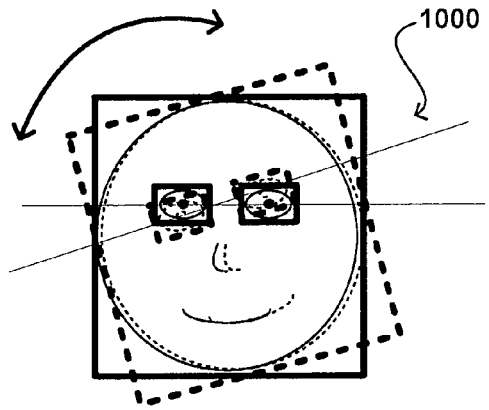
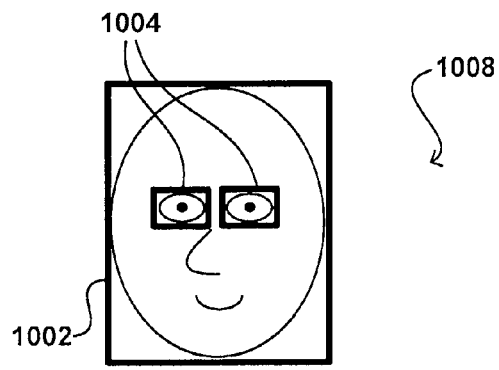
FIG. 10(e)  FIG. 10(f)

MOVEMENT RECOGNITION AS INPUT MECHANISM

BACKGROUND

The present patent application claims priority to U.S. Provisional Patent Application Ser. No. 61/116,430, entitled "MOVEMENT RECOGNITION AS INPUT MECHANISM," filed Nov. 20, 2008. The entire content of this provisional patent application is incorporated herein by reference.

BACKGROUND

As the variety of available computing devices increases, and as the size of many of these devices decreases, there comes a need to adapt the ways in which users interface with these computing devices. For example, while typing on a keyboard is an easy and acceptable way for many users to input information for a desktop computer, trying to enter information on a keyboard of a portable phone can be difficult due to the small form factor of the device. For example, the size of a user's fingers can prevent that user from easily pressing one key at a time. Further, as many of these devices move to touch screens or other such input devices, the size of a user's finger can also inhibit the user from successfully selecting an intended object or element on the screen, etc. Another disadvantage to using such touch screens is that fingerprints, dirt, smudges, and other remnants are left on the display screen, which can cause glare or other issues with clarity and/or visibility. Further, some users add an extra layer of protective material to prevent damage to the screen, but these devices can reduce touch sensitivity and amplify the negative effects of the residue left on the screen.

Further, many users prefer to use portable devices such as cellular phones, personal digital assistants (PDAs), and electronic book reading devices with one hand, and such operation becomes difficult using a touch screen or multiple-button input approach. Even for stationary devices (e.g., desktop computers) the standard keyboard and mouse-based approach can be undesirable for users who would prefer to view information without having to constantly move the mouse and scroll to the next area, select elements to navigate to the next page, etc.

BRIEF DESCRIPTION OF THE DRAWINGS

Various embodiments in accordance with the present disclosure will be described with reference to the drawings, in which:

FIGS. 10(a)-10(f) illustrate analysis of facial features of a user in accordance with various embodiments;

DETAILED DESCRIPTION

Figure 1:
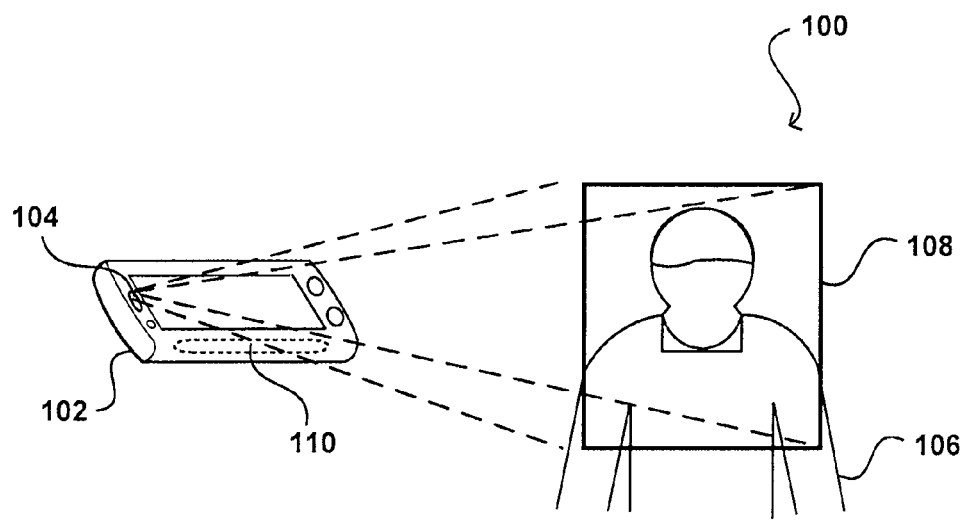
FIG. 1 illustrates an example of a portable device including an element operable to image the facial region of a user in accordance with one embodiment.

Systems and methods in accordance with various embodiments of the present disclosure may overcome one or more of the aforementioned and other deficiencies experienced in conventional approaches to controlling a system, device, interface, or other such object or element in an electronic environment. Systems and methods in accordance with various embodiments provide for input through relative movement, such as may be determined using an imaging element operable to image a recognizable portion of a user. A change in orientation of the device relative to the recognizable portion of the user, through movement of the user, the device, or a combination thereof, can be determined and used as input to control an aspect of the device. Further, the device may be able to image an adjustable aspect of the user, such as a facial expression of a user, a gesture, or other movement, and utilize a state of that adjustable aspect as input.

In one example, a user might want to enter text into a portable device, such as to enter a search query, type a text message, or perform a similar action. A user of a device in accordance with various embodiments is able to activate a control mode, such as a "facial recognition" mode, movement recognition mode, or similar mode as discussed herein, that allows the user to control the computing device using movements, expressions, or other changes in relative orientation to a user that can be detected by a camera or other imaging element of the device.

In one such device, a user can perform an action that causes a change (e.g. alteration) in a representation of a user interface, such as a virtual keyboard, selection boxes, radio buttons, or other selectable interface objects displayed on the device. For example, the virtual keyboard can be a conventional "QWERTY" style keyboard or any other appropriate display of selectable alphanumeric or other such characters. A cursor, movable icon, or other such element can be displayed that is able to move to any of the letters, numbers, or other characters displayed. Thus, the information displayed within the graphical user interface that is altered based on the change in orientation of the device with respect to the user (or environment) can correspond to any change in the display of the graphical user interface. For example, the user interface can be altered by moving a cursor with respect to the graphical user interface, adjusting a point of view used to generate a two-dimensional rendering of a three-dimensional image on the computing device, navigating among items associated with an electronic catalog, navigating a file system, selecting an item from a rotating selection mechanism, performing a function based at least in part on the determined change that is reflected in the user interface, navigating an electronic map system, among many other possibilities.

An imaging element, such as a camera, of the device can be positioned such that the imaging element is able to obtain images of at least a portion of the user while the user is operating the device. One embodiment, the camera is a high speed, high resolution, camera capable of capturing a large number of images in a small amount of time (e.g., a high speed camera or high speed video camera). The device can include an image processing algorithm that is able to analyze image information obtained from the imaging element and determine at least one relative location or orientation of a user with respect to the device. Thus, the image processing algorithm determines a change in the at least one relative location or orientation of a user with respect to the device. The information displayed within the graphical user interface can then be altered based at least in part on the determined change. In some embodiments, the information displayed within the graphical user interface excludes a representation of either or both of the obtained first and second images. That is, in such embodiments, the imaging element is not used to image a user of the device for display within the user interface. Rather, the user image information is used to provide input to control aspects of the graphical user interface.

For example, the algorithm can determine whether the device is directly facing the user by determining whether the user's eyes and/or head are substantially facing the device. If the device or user's head is tilted in one direction, the algorithm can determine the direction of relative movement or orientation and can control the position of the cursor over the displayed keyboard accordingly. For example, a user might tilt the device to the left or right to move the cursor across a row of letters, and might tilt the device forward or back to move the cursor over a column of letters, and/or any combination thereof. In such a way, the user can control the cursor or other input mechanism by simply moving or otherwise changing an orientation of the device, by changing a relative orientation of a determined aspect of the user, or both.

Although the embodiments described above generally relate to controlling input to a two-dimensional interface, embodiments can also be used to control aspects of a three-dimensional interface or display using such movements. For example, a user viewing a two-dimensional rendering of a three-dimensional image can adjust the displayed image by rotating or moving the device (or the user's head, etc.) in a direction corresponding to the desired direction of adjustment. Such motion is similar to looking into a box from an open end, wherein a user is able to view the top, bottom, and sides of the interior of the box by rotating the box to different angles or positioning the user's head such that the desired side is viewable. In some embodiments, the user is also able to zoom into various areas of the image or interface by performing a zoom action, such as by moving the device toward the user such that the algorithm analyzing the image information can detect that the user's features are getting closer to the device (e.g., their separation and/or size is increasing). Elements such as accelerometers also can, in some embodiments, assist with such determinations. In a case where a hierarchical categorization of information is presented in a three-dimensional manner, such an approach allows a user to quickly and easily access the desired level of information in the hierarchy by, for example, zooming to that level. A user then can access various items at that level by tilting or altering the position/orientation of the device to move a cursor or view as discussed above.

In another example, a user might utilize a device such as an electronic book reader or a portable media device to read a book, newspaper, or other such electronic content. When viewing such material, the user might desire to navigate to or "turn" to the next page of an electronic book (e-book), and might perform an action, such as tilting the device or turning the user's head to the right, to indicate that the user is ready to navigate to the next page. If a user is navigating through the book to find where the user left off, the user might enter a command by rotating the device or moving the user's head in a circle to start the navigation, and when the device gets to the page or point where the user left off, the user can perform another action such as smiling or nodding his or her head in a "yes" motion to indicate to the device that the user is satisfied with this location. There also can be one or more physical buttons, selection wheels, touch interfaces, and the like on the device that can be used in combination with the relative movements for input. For example, a user might tilt the device to the right to cause the electronic book reader to start turning pages of a book, and a user can press a button to indicate that the desired page is being displayed, signaling the device to stop paging through the e-book.

In an example where a user is browsing items offered through an electronic marketplace, such as via a website of a Web-based retailer, the user might view a number of items corresponding to a search request response or category of items. If the items are displayed in a three-dimensional grouping by category, for example, the user can tilt or move the device to zoom or otherwise move to the level of the desired category. Once at the desired level, the user can tilt the device or rotate his or her head, for example, to move to various items displayed at that level. In an example where the actions move a cursor, information about the item at the cursor position can be displayed in a popup or modal window. In another embodiment, the display might move to various items displayed when the user tilts the device, such that only a subset of the items at that level are displayed at any one time, depending upon where the user navigated. When the user is ready to view other items, the user can perform an action that instructs the device to present a new item or list of items. If the user likes an item or items displayed, the user can perform an action to indicate that the user is satisfied with at least one item being displayed. For example, if the user wishes to purchase an item, the user can perform an action such as nodding his or her head up and down to indicate that the user would like to purchase the item. In some embodiments, this single motion is enough to initiate a transaction on behalf of the user. However, in some embodiments, the user might be requested to confirm the purchase by performing an action, such as by nodding again or by using a physical switch (e.g. button or key). If the user wishes to buy more than one item, the user can indicate a quantity to be purchased or otherwise consumed, such as by holding up a number of fingers to represent the desired quantity. Many other such user actions can be used to provide input to the device.

In another example, a user viewing information on a Web page through a smart phone, or other device, might tilt the device up to have the page scroll up, and might tilt the page down to scroll the page down. The user also can perform actions such as moving the device toward the user to zoom in, or tilt the device to the right to move to the next page, or other such motions.

Again, many of these motions and movements of the device can be detected using an imaging approach as discussed above. Using only the imaging element(s) to perform the input can be advantageous in some embodiments. For example, costs and complexities involved in utilizing accelerometers can be eliminated. Further, an imaging approach can be used even if the device (or its imaging element) is held stationary. However, in some embodiments, using a motion detection element, such as an accelerometer, in addition to an imaging element can improve detection of motion, particularly in embodiments in which the associated device is moved to at least partly control the input. Additionally, using an accelerometer can allow for additional types of inputs by enabling the device to better distinguish between motions that might be similar with respect to an image, such as tilting the device forward and back versus moving the device up and down, where the user moves up and down in the image in each case.

FIG. 1 illustrates a configuration 100 in accordance with one embodiment wherein a portion of a user 106 operating a portable computing device 102 is imaged by an imaging element 104 of the portable device 102. It should be understood that the relative orientation of the user and the device shown in the figure is shifted for purposes of explanation, and that the user generally faces the front (or other face or side) of the device that includes a display element and the imaging element 104. Imaging element 104 may be, for example, a camera, a charge-coupled device (CCD), a motion detection sensor, or an infrared sensor, among many other possibilities. It should also be understood that, while a smart phone 102 is depicted in this example, the portable computing device could be any appropriate device able to receive and process input commands, such as a personal computer, laptop computer, television set top box, cellular phone, PDA, electronic book reading device, video game system, or portable media player, among others.

In this configuration, the imaging element 104 is on the same general side of the portable device 102 as a display element, such that when a user is viewing the interface in the display element the imaging element has a viewable area 108 that, according to this example, includes the face of the user 106. While in some embodiments the imaging element is fixed relative to the device, in other embodiments the imaging element can be operable to track the position of the user, such as by rotating the imaging element or an optical element (e.g. lens, mirror, etc.) that directs light to the imaging element. Although embodiments described herein use examples of the viewable area including the face of the user, the viewable area may include other portions of the body such as arms, legs, and hips, among other possibilities. In either case, the viewable area 108 of the imaging element can be configured to obtain image information corresponding to at least a portion of a user operating the device, and if the imaging element is continually (or at least substantially continually) capturing or otherwise obtaining image information then any movement of the user 106 relative to the device 102 (through movement of the user, the device, or a combination thereof) can cause a position or orientation of at least one aspect of that user within the viewable area 108 to change. If the device includes software and/or hardware that is able to locate at least one feature of the user that can be consistently determined, such as the eyes, nose or mouth of the user, then the device can analyze the image information to determine relative motion over a period of time and utilize that relative motion as input.

For example, a user can tilt the device or rotate the user's head, such as to nod up and down, in a "yes" motion. Such motion can be detected and analyzed by the imaging element (e.g. camera) as the position of the user's eyes in the viewable area 108 will move in the images. Further, aspects such as the imaged shape, size, and separation of the user's eyes also can change. Movement of the eyes in the viewable area could also be accomplished by moving the device up and down while the user remains still, as well as through other such motions. In some embodiments, the device is able to distinguish between movement of the user and movement of the device, such as by detecting movement of a background or other aspect of the images, or by analyzing the separation, shape, or size of various features. Thus, in embodiments described anywhere in this description that use the imaging element to determine an orientation or location of the device relative to its user, a user can have an option of inputting a given type of motion, corresponding to a specific command, by moving the device or altering an aspect of the user, or both.

As described above, when using the imaging element of the computing device to detect motion of the device and/or user, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g. a window, picture, tree, bush, building, car, etc.) moves to the left or right in the image, the device can determine that the device has changed orientation even though the orientation of the device with respect to the user has not changed.

In some cases, relative movement could be open to multiple interpretations. For example, in one application a device might be programmed to perform a first action if the device is moved up and/or down, and a second action if the device is instead tilted forward or backward. As should be apparent, each action can correspond to the position of the user's eyes moving up and/or down in the viewable area. In some embodiments, as will be discussed below, the camera and detection may be sensitive enough to distinguish between the two motions with respect to how the user's face changes in the captured images, such as the shape and separation of various features or other such aspects. In other embodiments, where it may be desirable for the process to utilize a fairly simple imaging element and analysis approach, it can be desirable to include at least one orientation determining element 110 in the device that is able to determine a current orientation of the device 102. In one example, the at least one orientation determining element 110 is at least one single- or multi-axis accelerometer is used that is able to detect factors such as three-dimensional position of the device, the magnitude and direction of movement of the device, as well as vibration, shock, etc. Other elements for detecting orientation and/or movement can be used as well within the scope of various embodiments for use as orientation determining element 110. When the input from an accelerometer is used with the input from the camera, the relative movement can be more accurately interpreted, allowing for a wider range of input commands and/or a less complex image analysis algorithm. For example, use of an accelerometer can not only allow for distinguishing between lateral and rotational movement with respect to the user, but also can allow for a user to choose to provide input with or without the imaging element. For example, if the device is a portable music player, the user can have the option of turning or moving the device to switch songs, fast forward, or perform any other such motion without having to turn the device so that the device is facing the user. Alternatively, the user can leave the device stationary and move or adjust aspects of the user, such as by moving the user's head to the right to skip to the next song. Some devices can allow a user to specify whether input is to be accepted from the imaging element, the orientation determining element, or a combination thereof.

Figure 2:
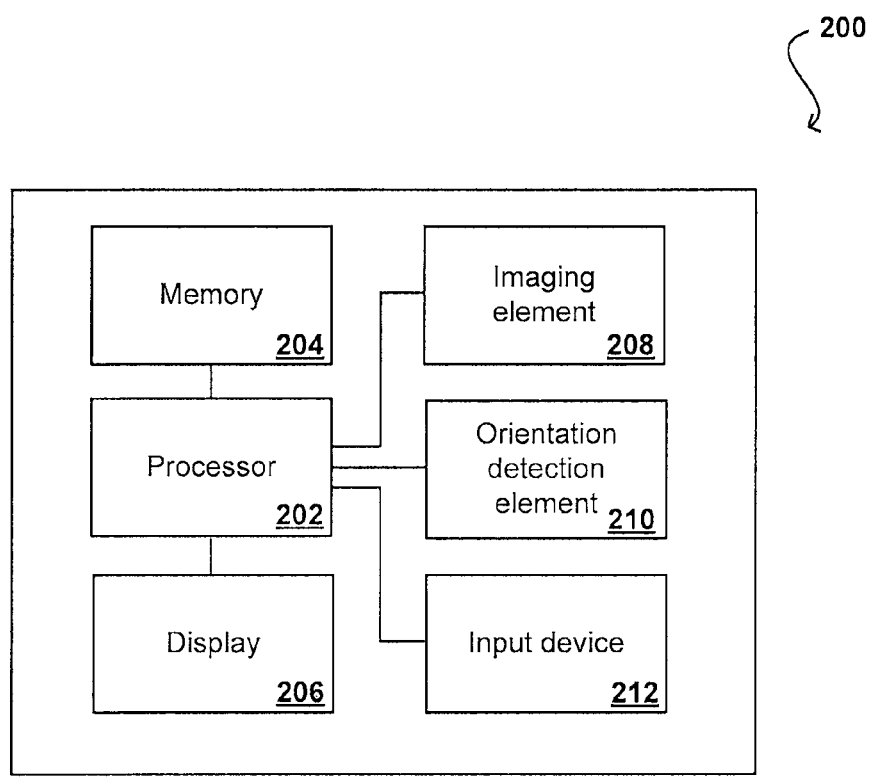
FIG. 2 illustrates components of a controllable device that can be used in accordance with one embodiment.

FIG. 2 illustrates a set of basic components of a computing device 200 such as the device 102 described with respect to FIG. 1. In this example, the device includes a processor 202 for executing instructions that can be stored in a memory device or element 204. As known in the art, the device can include many types of memory, data storage, or computer-readable media, such as a first data storage for program instructions for execution by the processor 202, a separate storage for images or data, a removable memory for sharing information with other devices, etc. The device typically will include some type of display element 206, such as a touch screen or liquid crystal display (LCD), although devices such as portable media players might convey information via other means, such as through audio speakers. As discussed, the device in many embodiments will include at least one imaging element 208 such as a camera that is able to image a facial region of a user. The imaging element can include any appropriate technology, such as a CCD imaging element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

As discussed, the device also can include an orientation detection element 210 able to determine and/or detect orientation and/or movement of the device. Methods for using elements such as accelerometers to determine orientation or movement of a device are also known in the art and will not be discussed herein in detail. In some embodiments the device can include at least one additional input device 212 able to receive conventional input from a user. This conventional input can include, for example, a push button, touch pad, touch screen, wheel, joystick, keyboard, mouse, keypad, or any other such device or element whereby a user can input a command to the device. Some devices also can include a microphone or other audio capture element that accepts voice or other audio commands. For example, a device might not include any buttons at all, but might be controlled only through a combination of visual and audio commands, such that a user can control the device without having to be in contact with the device.

Figure 3A:
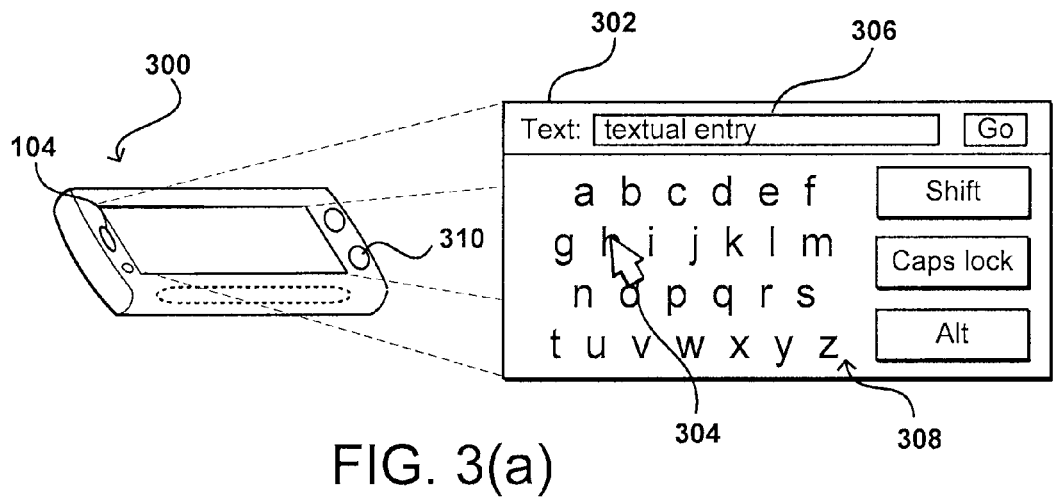
FIGS. 3(a)-3(i) illustrate approaches to inputting text information on a portable device that can be used in accordance with one embodiment.
Figure 3B:
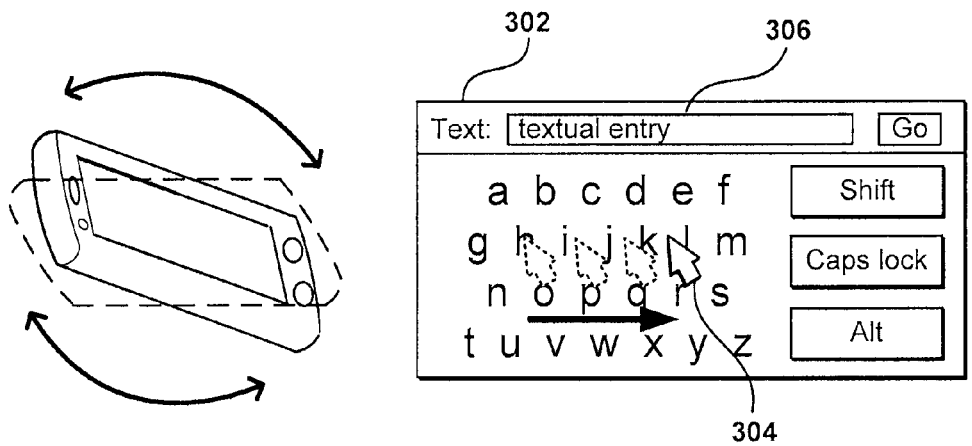
Figure 3C:
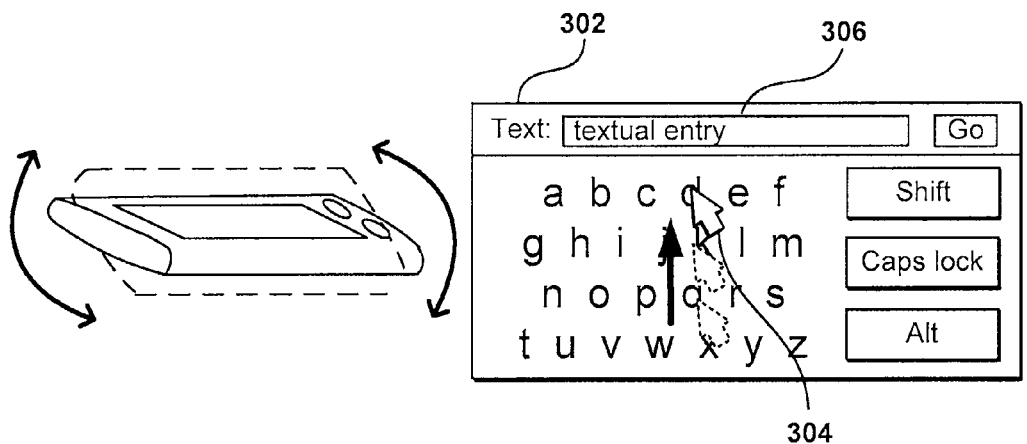

FIGS. 3(a)-3(c) illustrate embodiments of approaches that can be used to enter text on a portable device. In some embodiments, this can be accomplished without using conventional input devices such as real or virtual keys on a keyboard, keypad, or other such entry device. In this example, a user is attempting to enter text into a portable device 300. As can be seen, the device includes a display element 302 that allows a virtual keyboard 308 or other set or arrangement of characters to be displayed to the user. The display includes a cursor element 304 that can be moved over the characters of the virtual keyboard 308. A user can move the cursor 304 to select one or more characters, which can then appear in a text entry window 306 or other such element to provide input to the device.

As shown in FIG. 3(b), one method for providing input to the device is to tilt the device to the right or left, which corresponds to moving the cursor 304 across the keyboard to the right or left, respectively (or depending upon user preference, to the left or right, respectively). Similarly, FIG. 3(c) illustrates that a user can tilt the device forward or back to move the cursor 304 up or down, respectively (or down or up, respectively). In some embodiments, the user can move the cursor freely across the screen in any direction by tilting the device. In other embodiments, the user can move the cursor either across or up and down with a first motion, and can perform an action such as pressing a button 310 on the device or bringing the device back to face the user to stop that motion. The user then can move the cursor in the orthogonal direction by tilting the device in the appropriate direction. For example, if the characters are displayed in an array, the user can tilt the device to the left or right to select a column, perform an action to stop at the appropriate column, then tilt the device up and/or back to select the appropriate row in that column. As should be apparent, various other combinations and navigations or movements can be performed using similar approaches. Further, although described with respect to tilting the device, it should be understood that other motions as discussed herein such as translating the device or rotating the user's head can be used as well in various embodiments. Also, the characters can be displayed in any appropriate arrangement, and are not limited to rows or other such configurations.

The cursor is thus positioned such that it identifies an item, such as a character, for selection. This identification may include hovering a cursor over the alphanumeric character, changing a color of the alphanumeric character, changing a shape of the alphanumeric character, changing a background color of around the alphanumeric character, or displaying a shape (e.g. circle, square, rectangle, etc.) around the alphanumeric character, among many other possibilities.

According to some embodiments, a predictive text algorithm may be used to assist the user in quickly entering text into text entry window 308. For example, in some embodiments, after a character is entered the device 300 may automatically move the cursor 304 to a character that the algorithm has determined to most likely be the next character in the word the user is typing. The user may then select the predicted character or may move the cursor to the next desired character by further tilting or moving the device 300.

Figure 3D:
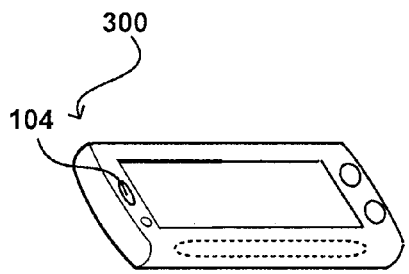
Figure 3D:
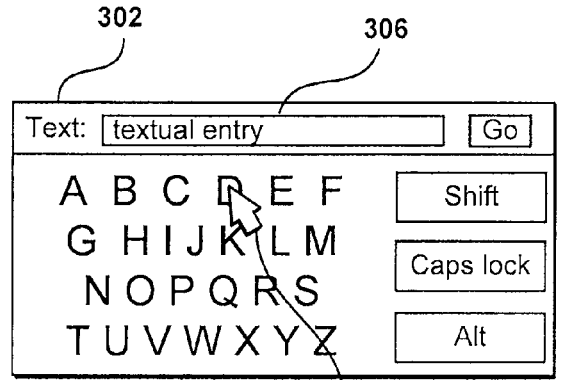
Figure 3E:
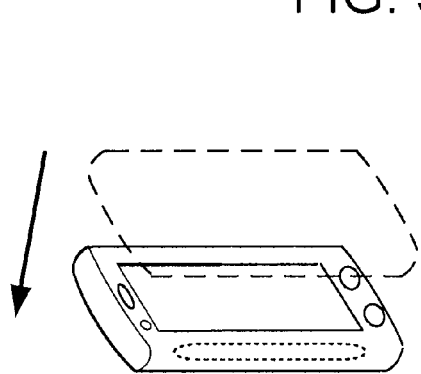
Figure 3E:
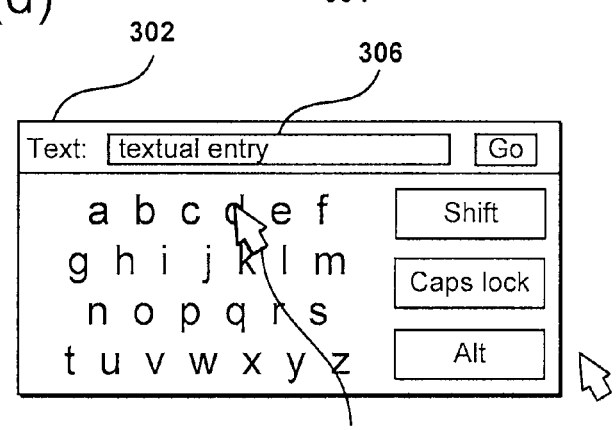
Figure 3F:
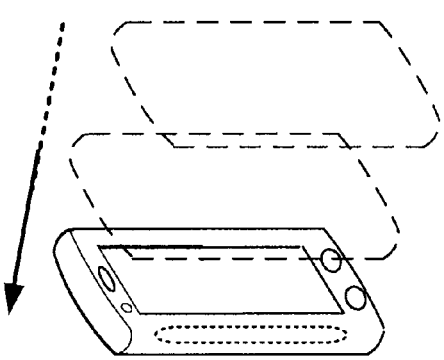
Figure 3F:
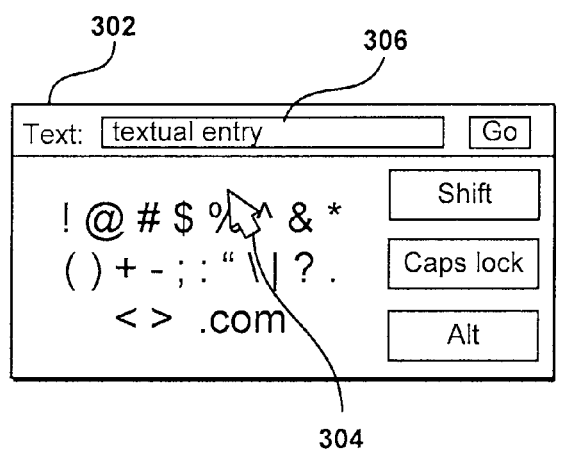
Figure 3G:
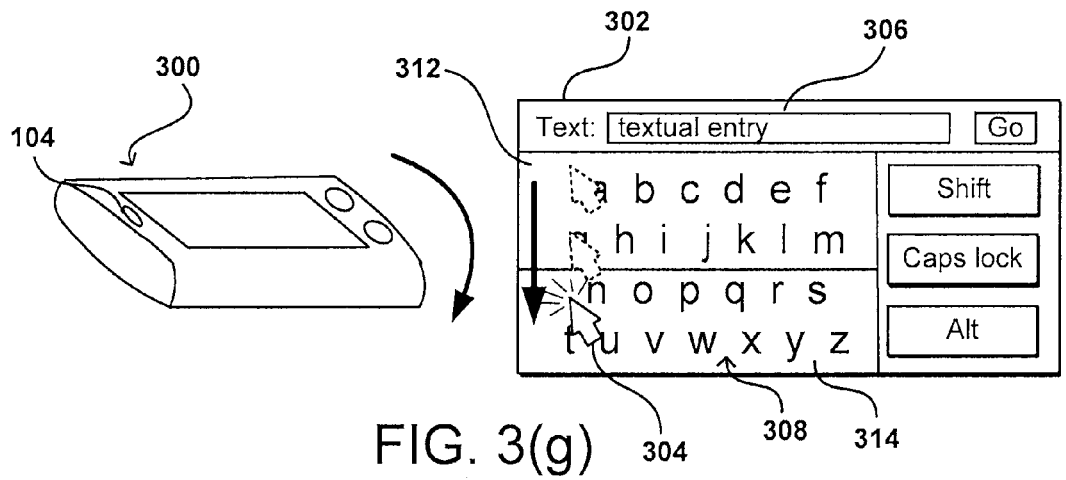
Figure 3H:
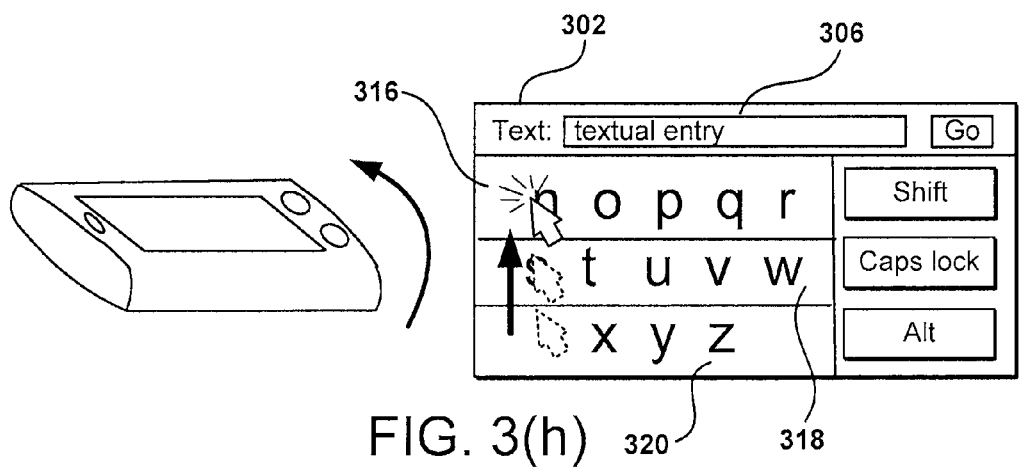
Figure 3I:
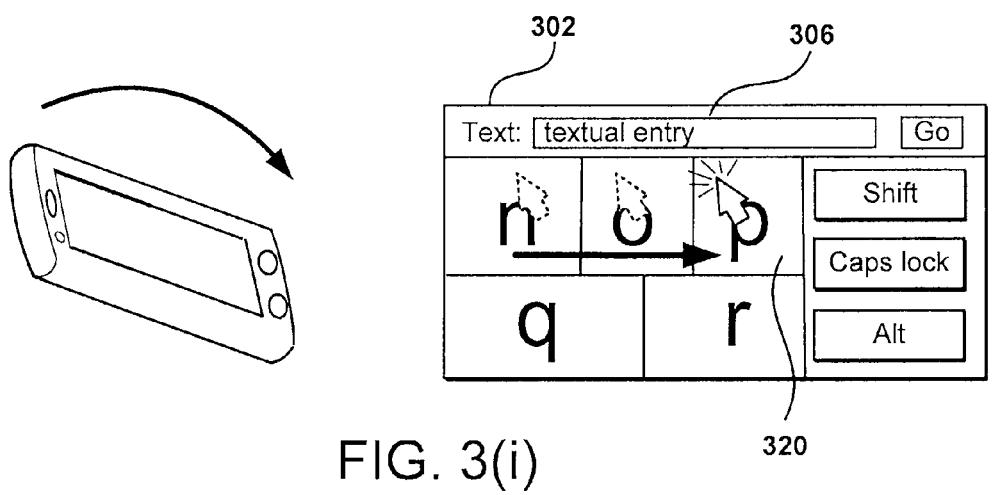

FIGS. 3(d)-3(f) continue the example of FIGS. 3(a)-3(c), depicting an embodiment in which the text input is selected using a third dimension in addition to the two dimensions discussed above. FIG. 3(d) depicts the device 300 in a first position that is detected to be relatively close to a user's body. Such detection can be made by use of the imaging element 208 and/or the orientation detection element 210. In this position the alphanumeric characters A-Z are depicted in their uppercase format within the display element 302. The user may then use the techniques set forth in the description related to FIGS. 3(d)-3(f) in order to move the cursor 304 left, right, up and down to select any of the desired characters. In FIG. 3(e), the device is in a position such that the imaging element 104 is now in a second position further away from the user's body by movement of at least one of the device and the user. The device 300 now detects that the device is in this second position and updates the display element 104 to show the lowercase version of the alphanumeric characters. Again, the user may then use the techniques set forth in the description related to FIGS. 3(*d*)-3(*f*) in order to move the cursor 304 and select any of the desired characters. In FIG. 3(*f*), the relative distance between the user and the device is altered again such that the imaging element 104 is now in a third position further away from the user's body than the first and second positions. The device 300 now detects that the device is in this third position and updates the display element 104 to show special characters (e.g. !, @, #, $, etc.). Again, the user may then use the techniques set forth in the description related to FIGS. 3(*d*)-3(*f*) in order to move the cursor 304 to select any of the desired characters.

In some embodiments, the device may be configured to temporarily "lock" the user interface into the first, second or third position while the user manipulates the device to enter in the desired alphanumeric characters. For example, the user may press a button on the device to "lock" the user interface in the respective position and release the button at a time when the user would like to move to another position.

Using such an embodiment with the third dimension can replace or supplement the need to select the shift, caps lock, or Alt buttons in order to toggle between the various modes of alphanumeric character entry. It should be understood that using the third dimension for toggling between uppercase, lowercase, and special characters is only one example of what the third dimension may be used for. For example, in other embodiments, an alphanumeric character set can be split among the various levels (e.g., A-J in the first position, H-T in the second position, and U-Z in the third position). Additionally, although only three positions are described, any number of possible positions in the third dimension are possible.

FIGS. 3(*g*)-3(*i*) depict another embodiment of how the described techniques can be used to select various inputs by segmenting the selectable items or elements (e.g. characters, portions or screen, etc.) into larger areas of the user interface and allowing the user to drill down to a specific selection by sequentially selecting the various segments. Such techniques may be particularly useful when, for example, the sensitivity of the camera is low or if the portable device is being used in an unstable environment such as a car or bus. Although FIGS. 3(*g*)-3(*i*) specifically depict the entry of characters for text input into the device, the techniques can be used for selection of any type of selectable element. FIG. 3(*g*) depicts portions of the user interface, here virtual keyboard 308, being segmented into two portions 312 and 314 corresponding to subsets of the characters. According to this example, the user desires to select the character "p" from the virtual keyboard 308. However, instead of moving the device such that the user moves cursor 304 over character "p", the user moves the cursor 304 to the specific portion that contains the character "p," here portion 314. This can be performed by, for example, tilting the device 300 and detecting movement using camera-based or orientation detecting mechanisms as previously described. The user may then select any area within portion 314 to progress or "drill down" to the next selection.

Upon the user selecting portion 314, portion 312 is discarded and portion 314 is enlarged and further segmented as depicted in FIG. 3(*h*), providing three subsets (e.g. portions). This time, character "p" is in portion 316 so the user tilts the device 300 such that the cursor 304 is positioned in any area of portion 316. At this time, the user selects portion 316, causing portions 318 and 320 to be discarded and portion 316 is enlarged for ease in selection of one of the remaining selectable items. Specifically, FIG. 3(*i*) depicts the remaining five characters divided into respective portions for selection by the user. The user then tilts the device such that the cursor is positioned anywhere in the portion 320, where character "p" is located, and selects the character for entry into text entry window 306. Device 300 may then be configured to return to a display as depicted in FIG. 3(*g*) to begin the text entry process again. In alternative embodiments, rather than altering the physical position or orientation of the device, the device can detect the changing position or orientation of the user relative to the device (via movement of both the user and the device) using imaging element 110 for selection.

According to another embodiment for character input, rather than moving the cursor with respect to a set of characters, the computing device can be configured to display one character at a time and, so that as the relative orientation of the device and the user is altered, the user interface of the device is configured to display a different character in the set of characters. For example, in one embodiment only a single character is displayed within the graphical user interface at a time and as the orientation is altered a different character is displayed for selection.

Figure 4A:
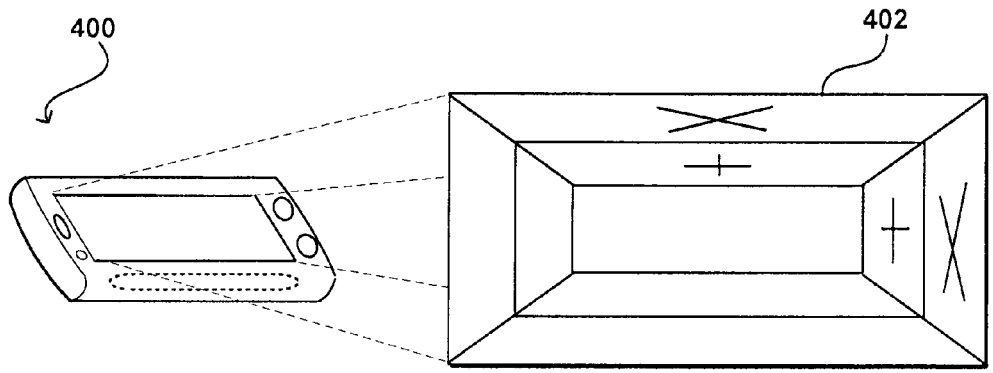
FIGS. 4(a)-4(c) illustrate approaches to altering the display of a three-dimensional space on a computing device in accordance with one embodiment.
Figure 4B:
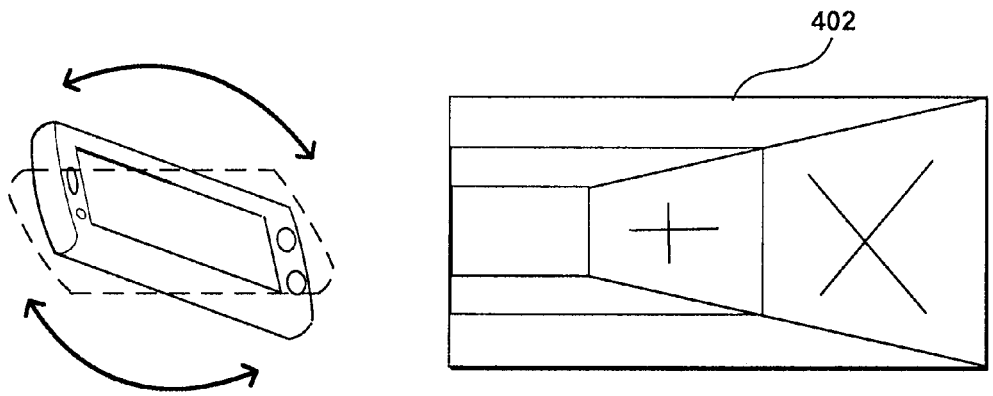
Figure 4C:
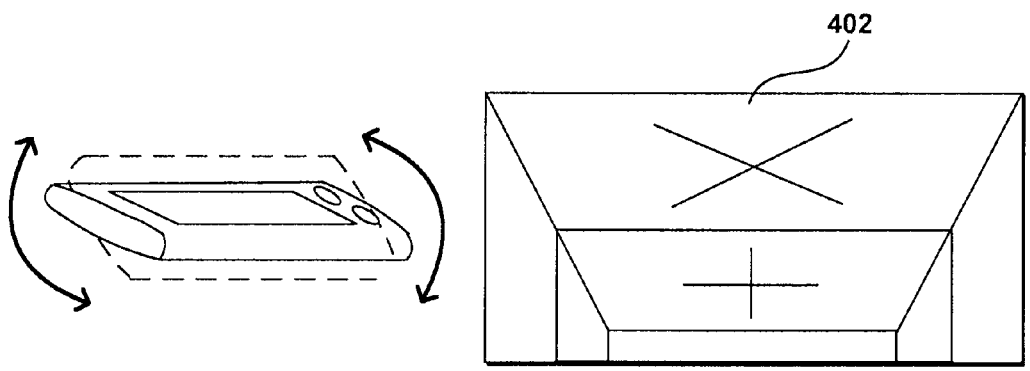

FIGS. 4(*a*)-4(*c*) illustrate an example of user navigation using input approaches similar to those described above. In this example, a three-dimensional environment is represented using the two-dimensional display element 402 of a computing device 400. As discussed above, the computing device can include at least one imaging element to obtain image information of at least a portion of a user of the device, and may further include an element able to determine an orientation of the device independent from, or in conjunction with, the image information. As illustrated in FIG. 4(*a*), when the user and the display element are substantially facing each other, a relatively straightforward view of the three-dimensional environment is rendered on the display. A user seeing the display in FIG. 4(*a*) might wish to get a better view of the elements displayed towards the right of the screen, or elements that are "off screen" to the right. As illustrated in FIG. 4(*b*), the user can tilt the device to the right (or left) or perform a similar motion that will be detected by the device as input to rotate the field of view rendered for display. The image that is displayed then can show an improved view of elements or portions of the image that were previously to the right of the center of the image. Similarly, the user might want to view elements or portions above or below that which is currently displayed by the display element. As illustrated in FIG. 4(*c*), the user can tilt the device forward or back to change the displayed image such that the image provides a point of view that better illustrates portions that were previously above or below a center point of the previous image. Thus, a user can change a point of view used to display the image by generating input through relative motion. Additionally, in some embodiments, once the image that is displayed is altered to display the elements or portions of the image that were previously displayed away from the center of the image, the device can be configured to receive an input to "normalize" or adjust the displayed image so that the displayed area of interest is reoriented to the center of the displayed image (e.g., the displayed X portion moves to the center of the display). This allows the relative orientation between the user and the device to return to a normal perpendicular viewing orientation. For example and referring to FIG. 4(*b*), after altering the orientation of device and user so that the X element is the area of interest, the device receives an input from the user that updates the display so that, rather than the + element, the X element is centered on the displayed image and the user can return to a normal perpendicular viewing position with respect to the device. The reorientation can be selected using a cursor or touch screen, button selection or gesture, among other possibilities.

While the example describes tilting the device, other motions such as moving the user's head or making a facial gesture can be used as described herein. For example, the same resulting image in display element 402 as in FIG. 4(b) can be achieved by the user leaning to the left of the device 400. Similarly, the same resulting image in display element 402 of FIG. 4(c) can be achieved by the user leaning to the bottom of the device 400. Additionally, in some embodiments, the ability to zoom into and out of the elements depicted in display element 402 can be accomplished using techniques described in FIGS. 3(d)-3(f). For example, the device or user can be moved closer or father away from each other in order to zoom in or out.

Figure 5A:
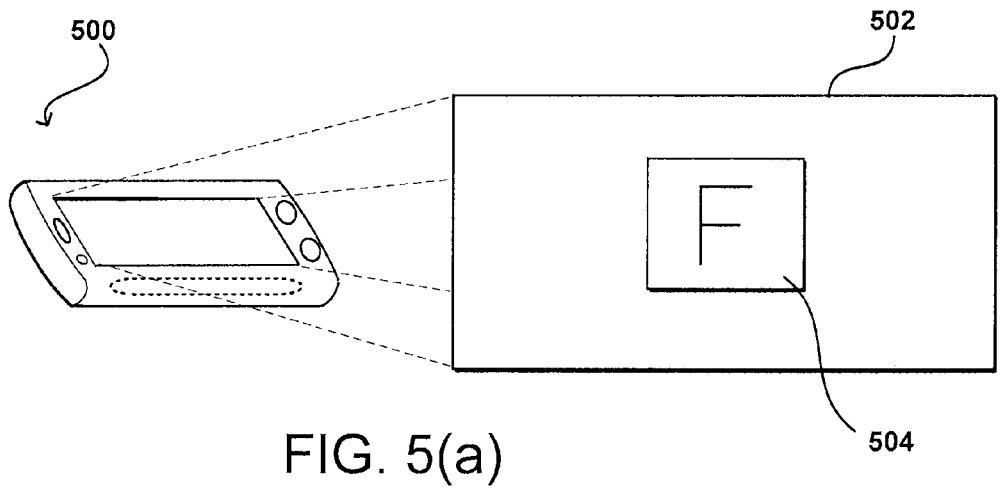
FIGS. 5(a)-5(c) illustrate approaches to altering the display of a three-dimensional object on a computing device in accordance with one embodiment.
Figure 5B:
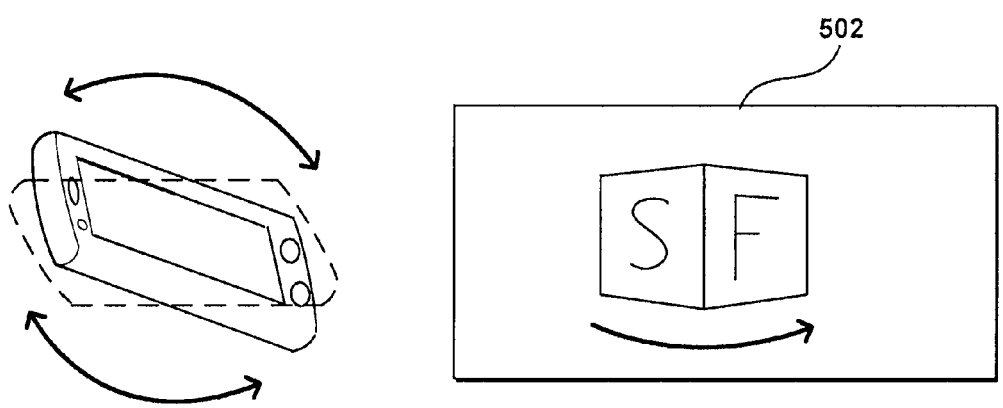
Figure 5C:
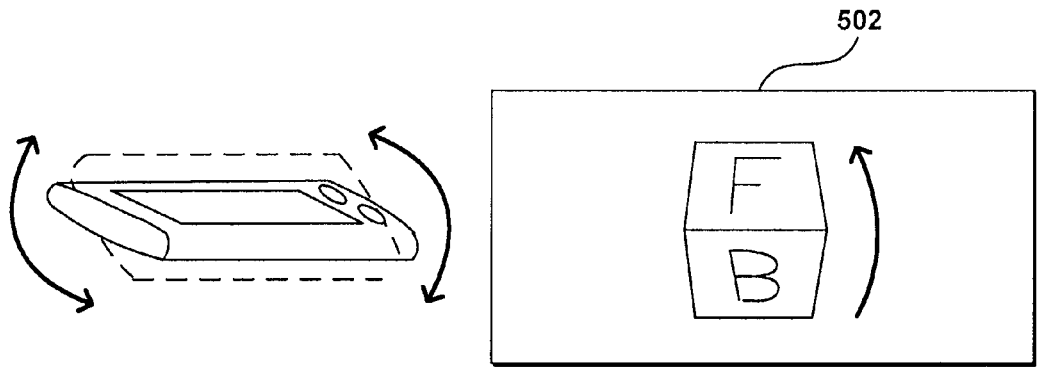

FIGS. 5(a)-5(c) illustrate another example of changing a field of view displayed as a result of relative motion input. In this example, a two-dimensional rendering of a three-dimensional item 504 is displayed using the two-dimensional display element 502 of the computing device 500. In this example, a block is rendered such that when the device and user are oriented to be substantially facing each other, the user is initially able to view the front face of the block 504. If a user wants to see a side portion of the block, such as is illustrated in FIG. 5(b), the user can tilt or rotate the device or the user's head, or perform another action discussed herein, which can cause the display to rotate the rendered view of the block. Similarly, the user can view the top or bottom faces through a motion such as tilting the device forward or back, as illustrated in FIG. 5(c). In some embodiments, the view can be tied to the relative position such that the user can at most see a portion of the side and front of the block, for example, as the user cannot generally view the display element from the back of the device. In other embodiments, the user can simply tilt the device in a specified direction, for example, and the view will continue to scroll or rotate in that direction until the user either quits tilting the device or performs another action which causes the rotation of the image to stop. Various other approaches can be used as well according to aspects described herein.

According to some embodiments the user can zoom in and out as described above. In one example, the user can zoom inside of the three-dimensional item 504 or zoom out to expose additional three-dimensional items within the display element 502 by altering the relative distance between the user and the device. Similar approaches to those described above can be used to select items within the display element 502.

Figure 6A:
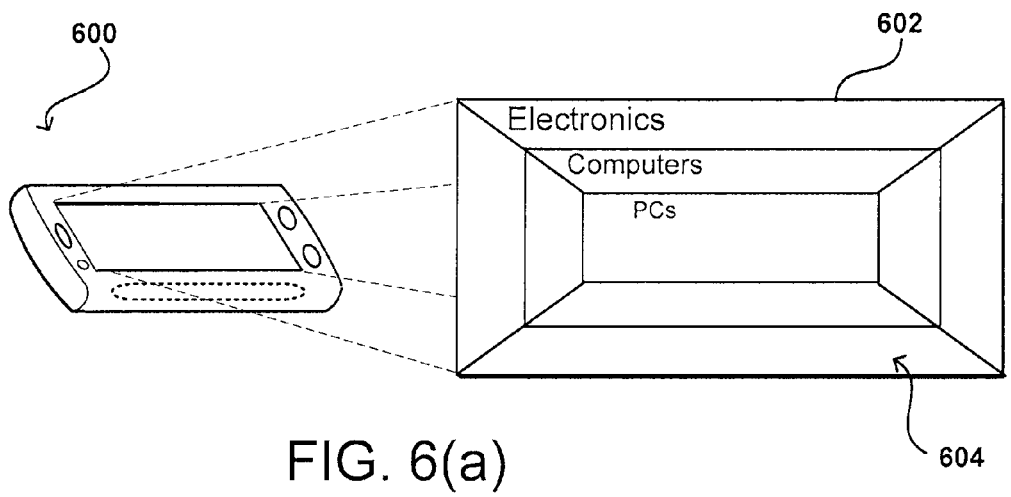
FIGS. 6(a)-6(g) illustrate approaches to navigating a three-dimensional interface on a computing device in accordance with one embodiment.
Figure 6B:
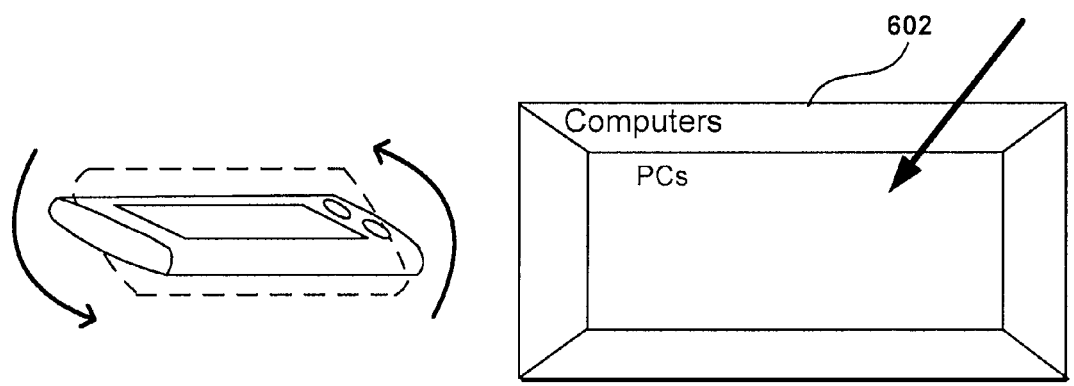
Figure 6C:
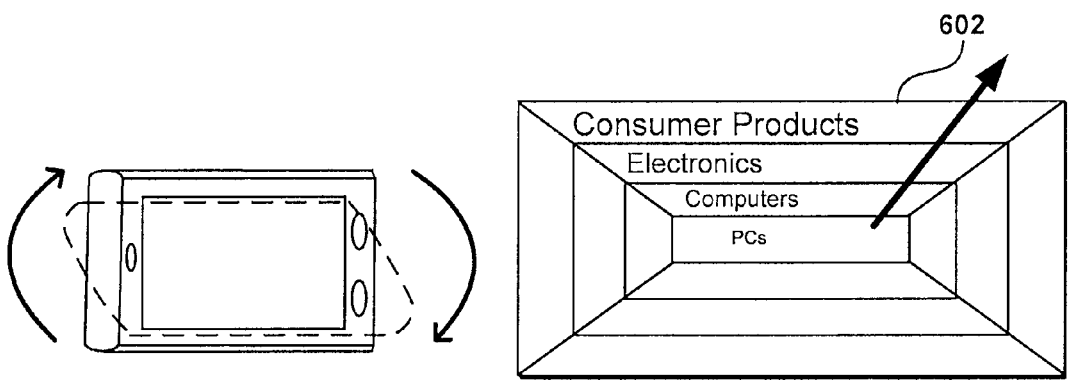

An ability to navigate in three-dimensions is not only advantageous for viewing images and other such information, but also can be useful for locating information using a three-dimensional interface. For example, FIG. 6(a) illustrates an example of an interface 604 on the display element 602 of a computing device 600 wherein the interface includes a plurality of different levels, each of which can correspond to a category or classification of information. For example, a user browsing for an item in an electronic marketplace might see various categories and subcategories displayed. In the example shown, wherein there is only one subcategory for each category, a user looking for a computer but not necessarily a personal computer might want to navigate directly to a page that includes items at the "computer" category level. In FIG. 6(a), the display is currently at the "electronics" category level, so the user might want to zoom in or otherwise move to the computer level. In this example, the user can perform an action such as tilting the device in a first direction as shown in FIG. 6(b) to zoom to the desired level. In other embodiments, the user may zoom in by moving the device (and imaging element) closer to the user as described in FIGS. 3(d)-3(f). The display at this level might include several items relating to computers, and the user can navigate to those items and view information using various motion approaches described herein. If, however, the user wants to instead look at other types of consumer products, the user might back out of the category hierarchy as illustrated in FIG. 6(c) to have a higher level node in the category hierarchy displayed. In some embodiments, at least the next highest and/or lowest level is indicated in the display at any time to help the user navigate or browse in the desired direction. In some cases, the user might tilt the device to move to the desired category level, then perform an action such as pressing a button to "lock" the display at that level. The user then can tilt the device to navigate between the items displayed at that level, using an approach such as that discussed with respect to FIGS. 3(a)-3(c).

Figure 6D:
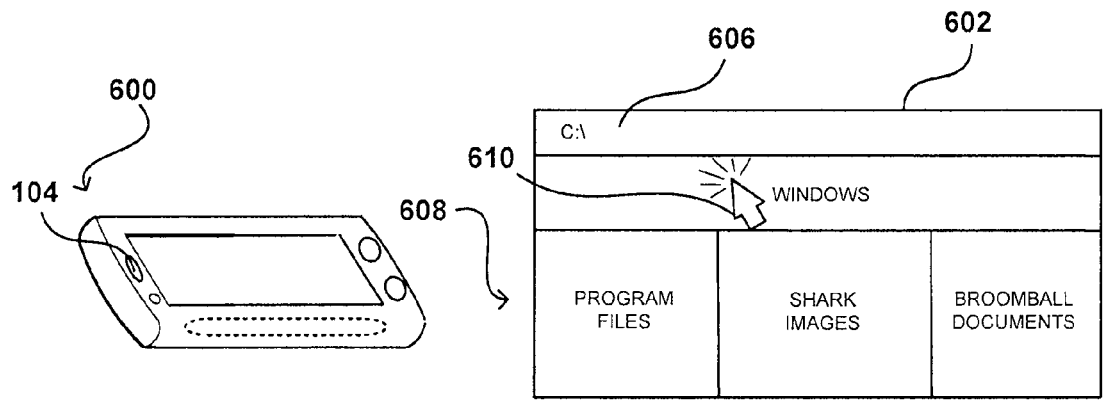
Figure 6E:
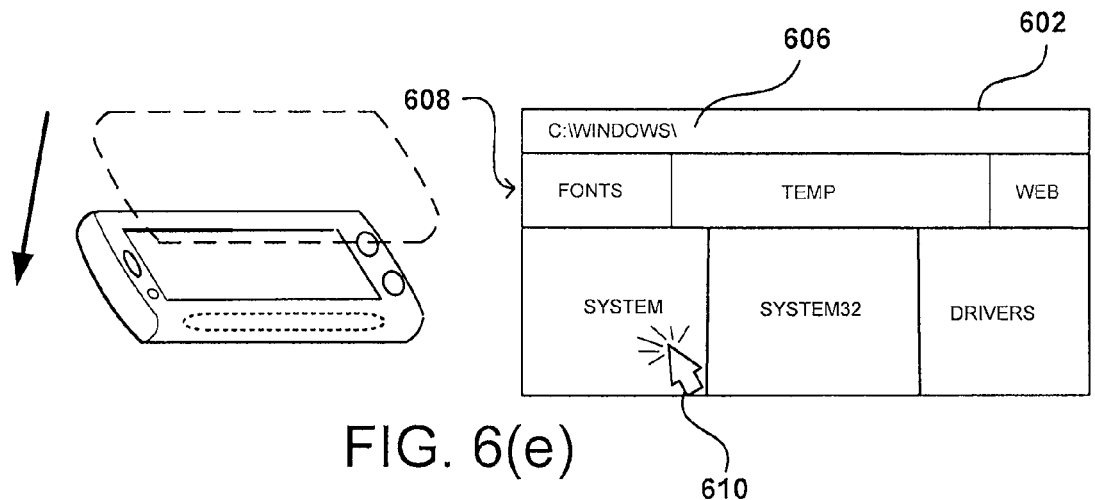

Although the embodiments of FIGS. 6(a)-6(c) depict usage in an electronic marketplace, many other potential uses are contemplated. For example, the interface could depict the layout (e.g., chapters or sections) in a book, a user's social graph, search results, a file system hierarchy, among many other potential uses. Thus, the user interface techniques described herein can be used for navigating and accessing practically any type of content. For example, FIGS. 6(d)-6(e) depict another example embodiment in which a computer file structure is navigated to locate documents of interest. Conventional file systems sometimes use a hierarchical structure starting with a root level directory which can be extended to multiple subdirectories that contain other subdirectories and/or files. Such conventional approaches may include interfaces that use graphical interfaces that use expanding folder trees to navigate through the file structure. Although the embodiments described herein can be used to navigate these conventional expanding folder trees (e.g. by tilting the device left, right, forward or backward), the three-dimensional nature of the various embodiments described herein can be used to navigate hierarchical file systems in other ways. For example, as depicted in FIG. 6(d), an example user interface 602 depicts a first portion 606 including a path identifier and a second portion 608 that provides a graphical representation of the files and folders located at the particular path. For example, in FIG. 6(d) these files and folders in the second portion 608 are depicted as "WINDOWS", "PROGRAM FILES", "SHARK IMAGES", and "BROOMBALL DOCUMENTS." The second portion may, in some embodiments, represent each file and/or folder according to its relative size.

Figure 6F:
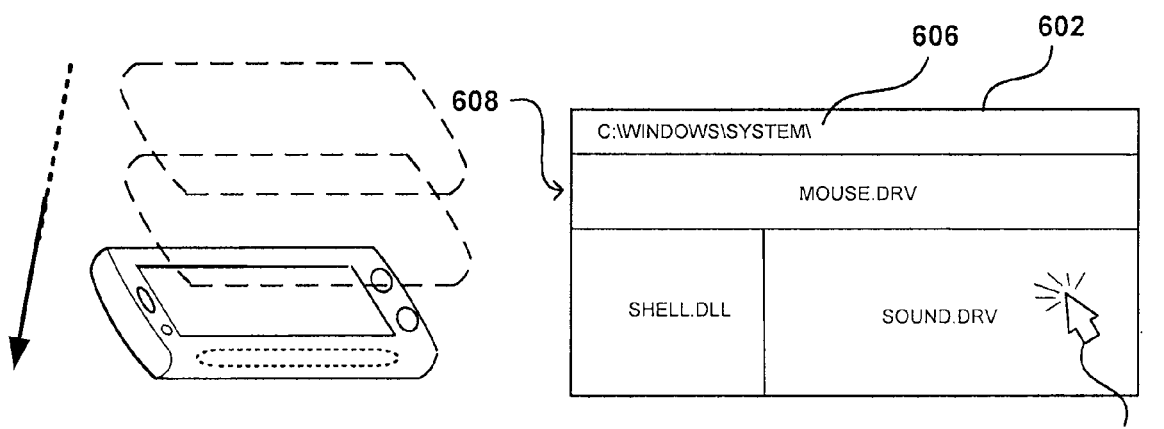
Figure 6G:
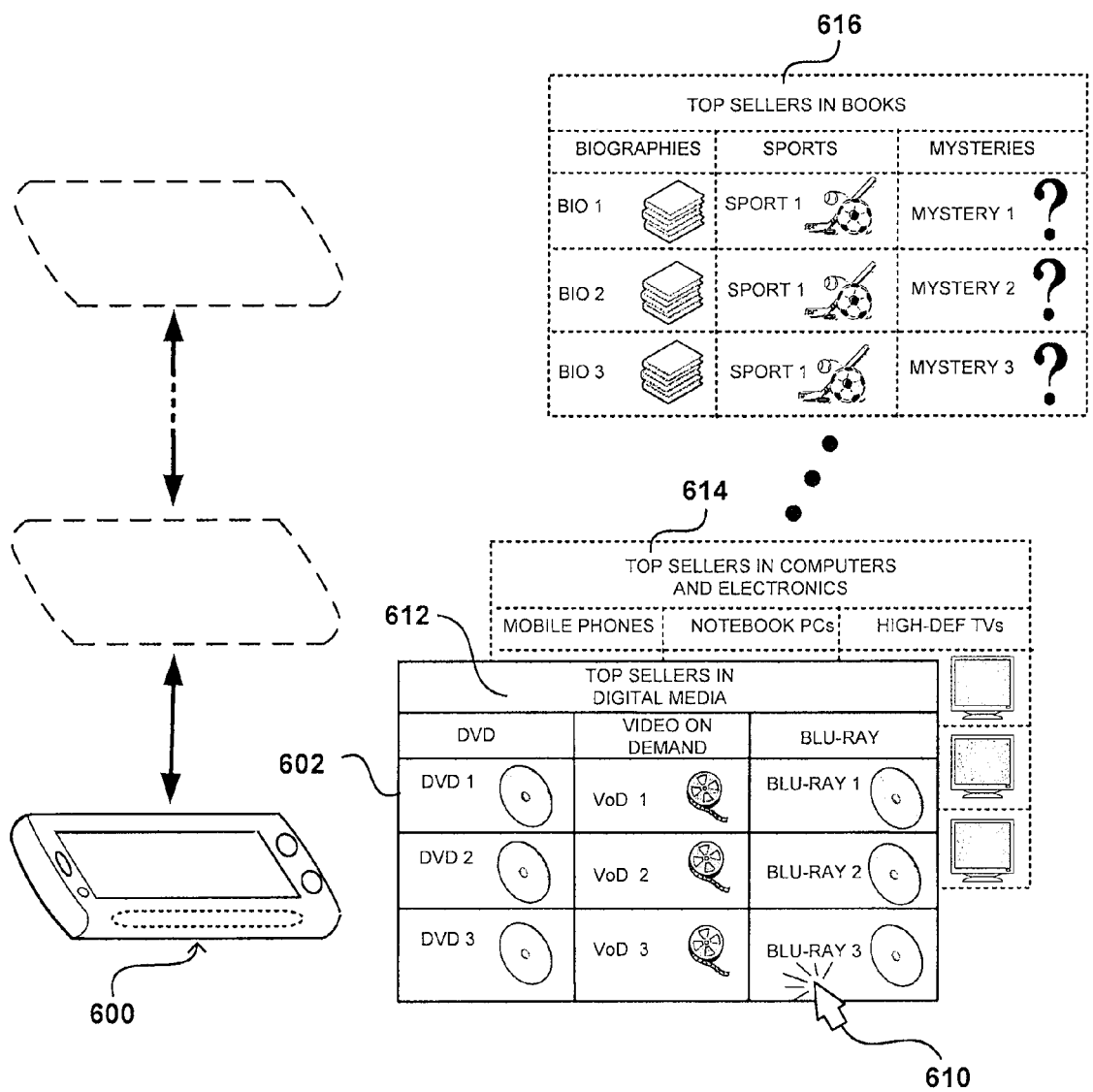
Figure 7A:
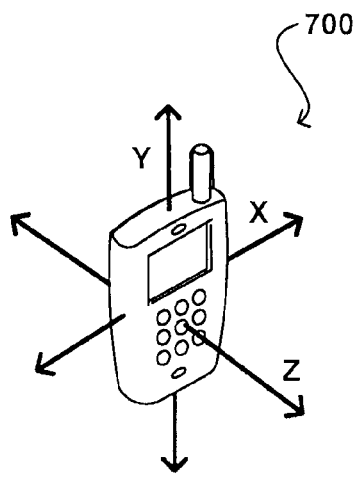
FIGS. 7(a)-7(d) illustrate examples of movements that can be recognized as input in accordance with one embodiment.
Figure 7B:
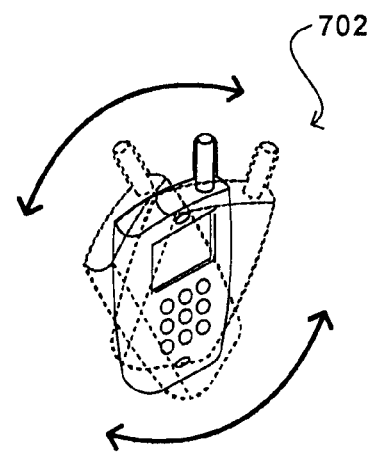
Figure 7C:
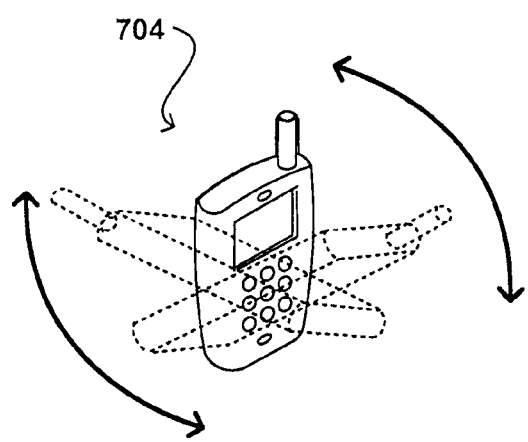
Figure 7D:
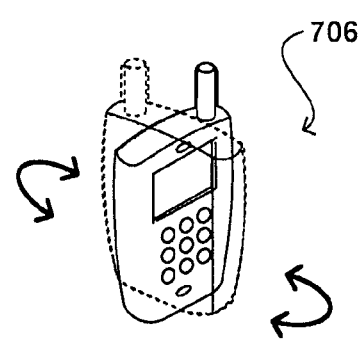

As depicted in FIGS. 6(d) and 6(e), the user has placed the cursor 610 over the directory "WINDOWS" and drawn the device 600 away from the user to select the "WINDOWS" directory, which is reflected in the first portion 606 of FIG. 6(d). The second portion 608 now reflects the folders that appear in the "WINDOWS" directory. The user has positioned the cursor over the "SYSTEM" directory and, as depicted in FIGS. 6(e) and 6(f), has selected the "SYSTEM" directory. FIG. 6(f) shows the resulting path in the first portion 606 and the associated files in the second portion 608. Here, the user can select any of the files associated with this path, including the "SOUND.DRV" file as depicted in FIG. 6(f).

The described embodiments can also be used to enable or activate many types of commands and actions (e.g. move, copy or save a file). A user can, for example, navigate to a desired location in the file system and perform a motion (or press a button, etc.) that indicates that a file is to be saved. At that point, the user interface may be configured to provide the ability for the user to enter in text corresponding to the desired file name using, for example, one or more of the methods described with respect to FIGS. 3(a)-3(g). In some embodiments, the user may use a conventional input device such as a keyboard, mouse, or touch interface to enter in the file name.

Although this example is specific to file systems, similar approaches can be used for navigating any kind of hierarchical structure, such as electronic catalogs, social profiles, search results, websites, etc. FIG. 6(*g*), for example, depicts a technique for navigating a three-dimensional electronic catalog. Here, device 600 is used to traverse a number of categories 612-616 of items in the electronic catalog. According to this example, one of the categories 612-616 are depicted within the user interface 602 at any one time. Again, the movement of device 600 can be used to traverse the categories of the three-dimensional catalog. For example, moving the device 600 along the axis defined by the arrow in FIG. 6(*g*) can cause the user interface 602 to sequentially show a respective category 612, 614, and 616 of items for purchase or other consumption (e.g. rental, lease, download, etc.).

According to yet another example, the described embodiments can include selecting items (e.g., products, files, directories, social profiles, etc.) from a rotating selection mechanism (e.g., carousel display, carousel view, etc.) as described in U.S. patent application Ser. No. 11/690,422, entitled "Method and System for Providing Item Comparisons and for Displaying Items", filed on Mar. 23, 2007. In such an embodiment the user can, for example, tilt the device to the left or right to cause the selection mechanism to rotate items to a position that is selectable by the user.

According to yet another example, the described embodiments can be used to navigate through a computer-based map system. Conventional map systems use touch-screen, keyboard, or mouse input from users to pan from location to location in the map and to zoom in and out for more or less detail. However, using approaches described herein, users can pan across maps by tilting the device (and camera) in various directions. Additionally, users can zoom in and out to reveal more map detail by moving the device closer or farther away from the user. In some embodiments, moving the device away from the user zooms in, while moving the device toward the user zooms out. In other embodiments, moving the device toward the user zooms in, while moving the device away from the user zooms out. According to some embodiments, assuming such image information is available to the computer-based map system, the user can zoom into an increasingly detailed view of a selected point. In some cases, the user may be able to actually view an image of the front of buildings or even peer into windows of the businesses, such as stores, to navigate within the store and view inventory available for purchase. Likewise, the user may move the device in the opposite direction to zoom out to see a birds-eye view of a particular area.

As discussed, various motions of a device can be used to provide input. These motions can be detected by analyzing image information obtained by an imaging element, and also in at least some embodiments can take advantage of an orientation detection element 210. The orientation detection element may include one or more motion sensors, accelerometers, level sensors, global positioning system (GPS) receivers, compasses, orientation determining mechanisms, or any other appropriate type of device, component, or element able to make some type of determination relating to at least one of a position, orientation, and movement of a computing device. For example, FIG. 7(*a*) illustrates a device 700 that is able to detect motion along three degrees of freedom (e.g. along the X axis, Y axis, and Z axis). In this device, an element such as an imaging element or orientation detection element 210 can be used to detect movement of the device that is primarily forward or backward, up or down, and/or side to side (and combinations thereof). As discussed, moving a device up and down can perform the same function as a user nodding his or her head, while in other embodiments these actions can act as different inputs that cause different actions to be performed. FIG. 7(*b*) illustrates a device 702 that is able to detect a rotational motion, providing yet another degree of freedom for input. For example, the rotational motion can include tilting the device 702 to the left or right about the Z axis. Such a motion can allow a user to provide input simply by flicking the user's wrist to the right or left while holding the device. Such an input can be useful for applications such as reading an electronic book, where a user can simply tilt or flick the device to the right to move to the next page or tilt the device to the left to move back to the previous page. It should be understood, however, that similar input can be generated in some embodiments by the user tilting his or her head for the same motion (although the algorithm would have to take into account the "mirroring" effect that the user tilting his or her head to the right to advance to the next page would actually appear in the image as the user's head tilting to the left).

Similarly, FIG. 7(*c*) illustrates an example of a device 704 that is able to detect forward or back rotation, providing yet another degree of freedom for input. For example, the forward or back rotational motion can include tilting the device toward or away from the user about the X axis. As discussed above, sensors for detecting such motion can be advantageous in some embodiments as it can be difficult for certain devices to differentiate between tilting forward and backward and being moved up and down using just a camera or imaging element, as the general effect of each in the image is the user's face moving up and down in the captured image. By combining the movement of the device as detected by an orientation determining element, for example, the device can more easily distinguish between such motions. This allows for another degree of freedom, and thus allows for more types of input for the device. Such movement can be useful for moving up and down a page, or moving up or down levels in a browse tree or viewing hierarchy, for example. Such a movement also can be valuable for increasing item quantity, such that a user wishing to purchase an item can tilt the device "up" or "back" to increase the number of items to be purchased, and can tilt the device "down" or "forward" to decrease the number or item quantity. FIG. 7(*d*) illustrates yet another example of a device 706 that is able to detect left or right rotation about the Y axis, providing yet another degree of freedom for input. As discussed above, sensors for detecting such motion can be advantageous in some embodiments as it can be difficult for certain devices to differentiate between tilting forward and backward and being moved up and down using an imaging element alone. Accordingly, using each of (and combinations of) the potential motions described with respect to FIGS. 7(*a*)-7(*d*), the device is configured to detect orientation changes in at least six degrees of freedom.

As discussed, the motions of FIGS. 7(*a*)-7(*d*) can be used by themselves or in combination with other motions, expressions, or inputs to control at least some aspects of an interface or device. Further, any number and combination of these or other motions can be used as desired for input. It should be understood that complex motions also can be utilized. For example, a user wishing to access email might perform a complex motion, such as moving the device to the right and then tilting the device back. Or, a user wishing to access a virtual shopping cart for an electronic marketplace being browsed on the device might tilt the device to the right, then to the left, and then back to the right. As can be seen, the potential number of inputs is infinite and is limited primarily by the practical number of motions that a user can be expected to remember and perform.

Some devices might not include accelerometers or other such elements that are able to detect motion or orientation. In other devices, it might be desirable to analyze as much information as possible in order to properly interpret any motion. Accordingly, systems and methods in accordance with various embodiments can analyze image information not only to determine relative motion, orientation, and/or position, but also can analyze information such as the size, shape, and/or relative separation of various features of an image in order to more accurately determine a motion being performed.

Figure 8A:
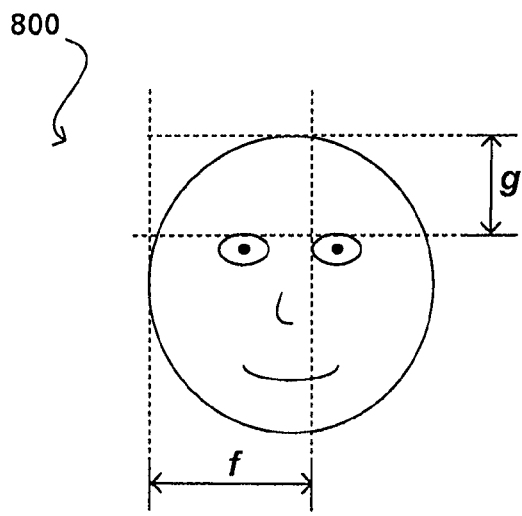
FIGS. 8(a)-8(c) illustrate examples of relative views of a user of a computing device that can be recognized as input in accordance with one embodiment.
Figure 8A:
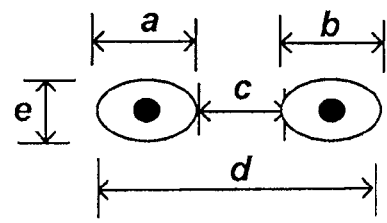
Figure 8B:
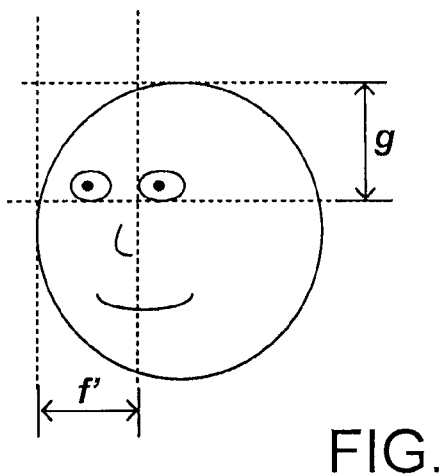
Figure 8B:
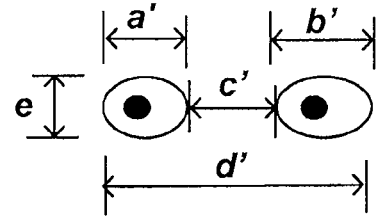
Figure 8C:
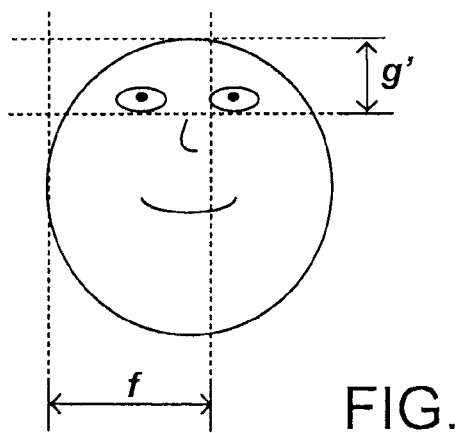
Figure 8C:
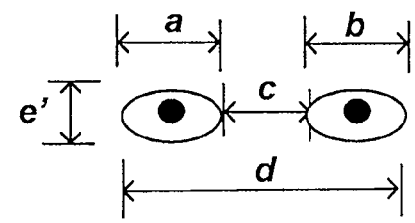

For example, FIG. 8(a) illustrates an image of a face 800 of a user of a device as could be captured (e.g. obtained, imaged, etc.) by an imaging element of the device. Thus, face 800 is depicted as perceived by the imaging element of the device. As can be seen, there are various aspects of the user's face that can be located and measured, such as the perceived width and height of a user's eyes, the perceived relative separation of a user's eyes, and the perceived relative position of the user's eyes to the edge of the user's face when facing the device. Any of a number of other such measurements or aspects can be used as should be apparent. When a user tilts or translates the device, or moves his or her head in any direction, there will be a corresponding change in at least one of these measured aspects in subsequent images that are obtained. For example, consider the exaggerated view of the user in FIG. 8(b), which could result from the user moving the device or tilting his or her head. As can be seen, the horizontal position (e.g., f vs. f') of the user's eyes with respect to an edge of the user's face has changed. Further, the shape or horizontal measurements (e.g., a vs. a' and b vs. b') of the user's eyes have changed, as well as the separation (e.g., c vs. c'). Using such information, the device can determine that a type of horizontal motion occurred. If instead the motion was a primarily vertical motion, such as illustrated in FIG. 8(c), the vertical position (e.g., g vs. g') of the user's eyes with respect to an edge of the user's face has changed. Further, the shape or vertical measurements (e.g., e vs. e') of the user's eyes have changed.

Thus, by analyzing the image information captured by the device, a relative motion or orientation of the device with respect to the user, potentially including the user's face, can be detected and interpreted even if there is no accelerometer or other such orientation-detecting element in the device. Such orientation detection elements could be included, however, and the information combined to more accurately determine motion of the device and/or user.

Figure 9:
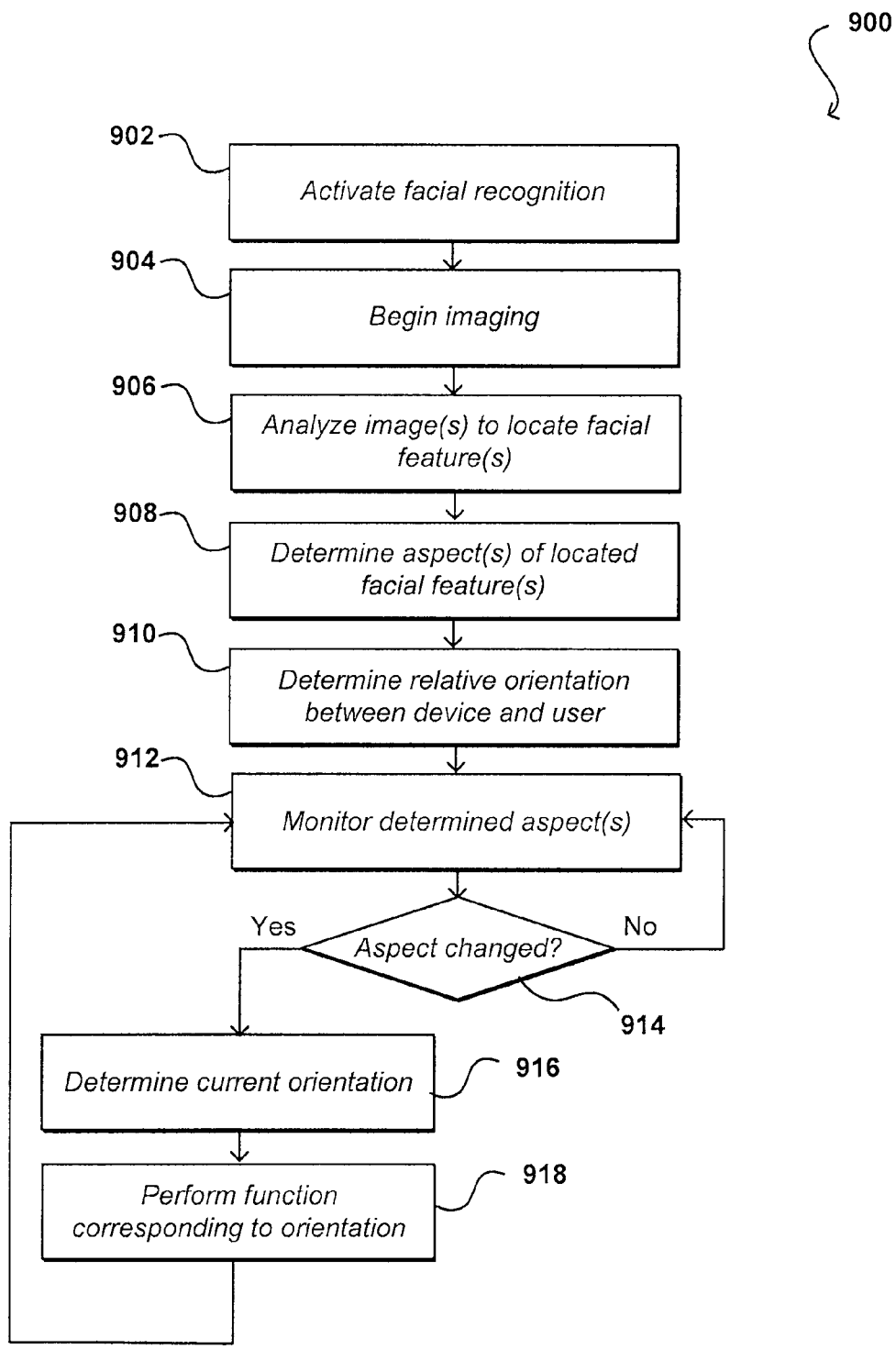
FIG. 9 illustrates an example of a method for detecting relative movement that can be used in accordance with one embodiment.

FIG. 9 illustrates an example of a process 900 for determining input through relative motion that can be used in accordance with one embodiment. In this process, a facial recognition mode (or similar mode) of the device is activated 902 using approaches such as those discussed herein. In some instances this might occur automatically at startup, and in other instances this might require first receiving an activation request on behalf of the user. An imaging element of the device begins to obtain image information corresponding to the viewable area of the element 904, and the images are analyzed to locate at least one desired facial feature of the user 906. In some cases, this process might require analyzing one or more images, or a stream of images, to locate features such as the eyes of the user. Once appropriate facial features of the user are located within an acceptable degree of certainty, various aspects of those facial features are determined 908. For example, if the features include a user's eyes, an algorithm can determine the dimensions of each eye, the separation, the relative position with respect to the face, distance from the nose, or other such aspects, such that a change in orientation can be detected. In other embodiments, this can include information such as dimensions of the user's mouth, such that a change in expression can be detected. Based on the determined aspects, an initial orientation of the device with respect to the user is determined 910. In some embodiments, a device might require a user to face the device during initial calibration. In other devices, such as where user information is stored, the device can capture a single image and analyze the information to determine a relative orientation by comparing measured aspects from the image with stored aspect information for the user.

Once the orientation is determined, image information can be analyzed continually (or at least periodically) in order to monitor variations in the determined aspects of the facial features 912. If a variation in any of the aspects is detected 914, the measured aspects are analyzed and a current orientation of the device with respect to the user is determined 916. For example, if it was detected that the position of a user's eyes changed, an algorithm can be used that analyzes various aspects such as dimensions and separation to determine a relative orientation, such as whether the user tilted the device to the left or right, or rotated his or her head. A function corresponding to the new orientation then can be performed 918. For example, if the user is tilting the device to the right, then the device might scroll the display to the right. If the user is tilting a device up, then a cursor of the display might be moved up the display. Any other appropriate function can be performed in response to a detected motion or change in orientation as discussed herein. Orientation information from an orientation detection element such as an accelerometer also can be used to make determinations as to orientation or other aspects.

In some embodiments, any detectable amount of motion can be utilized as input. For example, a user who is slightly tilting a device might have a cursor move slowly across a display, while a user who is tilting the device at a steep angle might have the cursor move quickly across the display. Because a user might not be able to hold a device perfectly still, however, particularly when holding a device in one hand, there can be at least a threshold amount of movement (e.g. an input threshold) required in order to cause a function to be performed. For example, a user might have to tilt the device at least five degrees in order to cause a cursor to move or a display to scroll or rotate. The orientation can be relative, such as where a "normal" orientation occurs when a plane of the display of the device is substantially orthogonal to a direction of viewing between the device and the user's eyes. Even when a device rotation is detected, if there is a corresponding movement of the user (such as where a user sits back or lays down) then there may not be any input registered as the "relative" orientation has not changed. In some embodiments, only movements relative to this "normal" orientation are registered.

Various approaches can be utilized for locating one or more desired features of a user's face to determine various aspects useful for determining relative orientation. For example, if a user's head is to be used as input, there can be many objects that can be shaped similar to a human head that could give false readings. Also, a user nodding "no" might not actually move the position of the user's head enough to register the movement. Accordingly, various approaches utilize features such as a user's eyes to assist in position and movement determination. For example, an image can be analyzed to determine the approximate location and size of a user's head or face. FIG. 10(a) illustrates an example wherein the approximate position and area of a user's head or face 1000 is determined and a virtual "box" 1002 is placed around the face as an indication of position using one of a plurality of image analysis algorithms for making such a determination. Using one algorithm, a virtual "box" is placed around a user's face and the position and/or size of this box is continually updated and monitored in order to monitor relative user position. Similar algorithms can also be used to determine an approximate location and area 1004 of each of the user's eyes (or in some cases the eyes in tandem). By determining the location of the user's eyes as well, advantages can be obtained as it can be more likely that the image determined to be the user's head actually includes the user's head, and it can be determined that the user is facing the device. Further, the relative movement of the user's eyes can be easier to detect than the overall movement of the user's head when performing motions such as nodding or shaking the head back and forth.

Various other algorithms can be used to determine the location of features on a user's face. For example, FIG. 10(*b*) illustrates an example wherein various features on a user's face are identified and assigned a point location 1006 in the image. The system thus can detect various aspects of user features and can determine changes such as movement or change in shape or expression. Such an approach provides advantages over the general approach of FIG. 10(*a*) in certain situations, as various points along a feature can be determined, such as the end points and at least one center point of a user's mouth. Accordingly, expressions such as a smile or frown can be captured even though the overall position of the user's mouth or face did not move.

Once the positions of facial features of a user are identified, relative motion between the user and the device can be detected and utilized as input. For example, FIG. 10(*c*) illustrates an example where the user's head 1000 is moving up and down with respect to the viewable area of the imaging element. As discussed, this could be the result of the user shaking his or her head, or the user moving the device up and down, etc. FIG. 10(*d*) illustrates a similar example wherein the user is moving right to left relative to the device, through movement of the user, the device, or both. As can be seen, each movement can be tracked as a vertical or horizontal movement, respectively, and each can be treated differently as an input to perform a specified function. In one example, the monitored movements are used to control the position of a cursor on the interface display by following the up, down, and across motions. As should be understood, such a process also can detect diagonal or other such movements. FIG. 10(*e*) further illustrates an example wherein the user tilts the device and/or the user's head, and the relative change in eye position is detected as a rotation. In some systems, a "line" that corresponds to the relative position of the eyes can be monitored, and a shift in angle of this line can be compared to an angle threshold to determine when the rotation should be interpreted as input.

FIG. 10(*f*) illustrates another advantage of using an approach such as that described with respect to FIG. 10(*b*) to determine the position of various features on a user's face. In this exaggerated example, it can be seen that the features of a second user's head 1008 have a different relative position and separation. Thus, the device also can not only determine positions of features for a user, but can distinguish between different users. As discussed later herein, this can allow the device to perform differently for inputs from different users. Also, the device can be configured to detect how close a user is to the device based on, for example, the amount and ratio of separation of various features, such that the device can detect movement towards, and away from, the device. This can also be accepted as input, and can be used to perform actions such as three-dimensional (3D) navigation.

Further, although many embodiments are described with respect to facial features and/or head movements, it should be understood that a device can capture and analyze other types of movement useful for providing input. For example, a user might be able to manipulate a cursor on a display by changing a hand position or "drawing" in the air. A user also might be able to hold up a number of fingers to provide numerical input, such as by holding up three fingers, then two fingers, then four fingers (possibly followed by some end command) to input the number "324". In one embodiment, a user can hold up any number of fingers in any distinguishable orientation to provide input, and in some embodiments can use representations (e.g., letters, words, or phrases) to provide input. For example, if a user is filling out a form to purchase an item and needs to fill in a shipping address, the user might be able to perform a motion such as holding up a specific finger, making a motion for "home", or any other appropriate motion, whereby the device knows to fill in the form using the "home" address information stored for the user.

It also should be understood that complex motions used for input can be a combination of facial movements and device movements. For example, a user wishing to shut the device down might perform actions such as tilting the device to the right and then nodding up and down. Any of a number of combinations of actions to act as inputs should be apparent to one of ordinary skill in the art viewing the teachings and suggestions contained herein.

Figure 11:
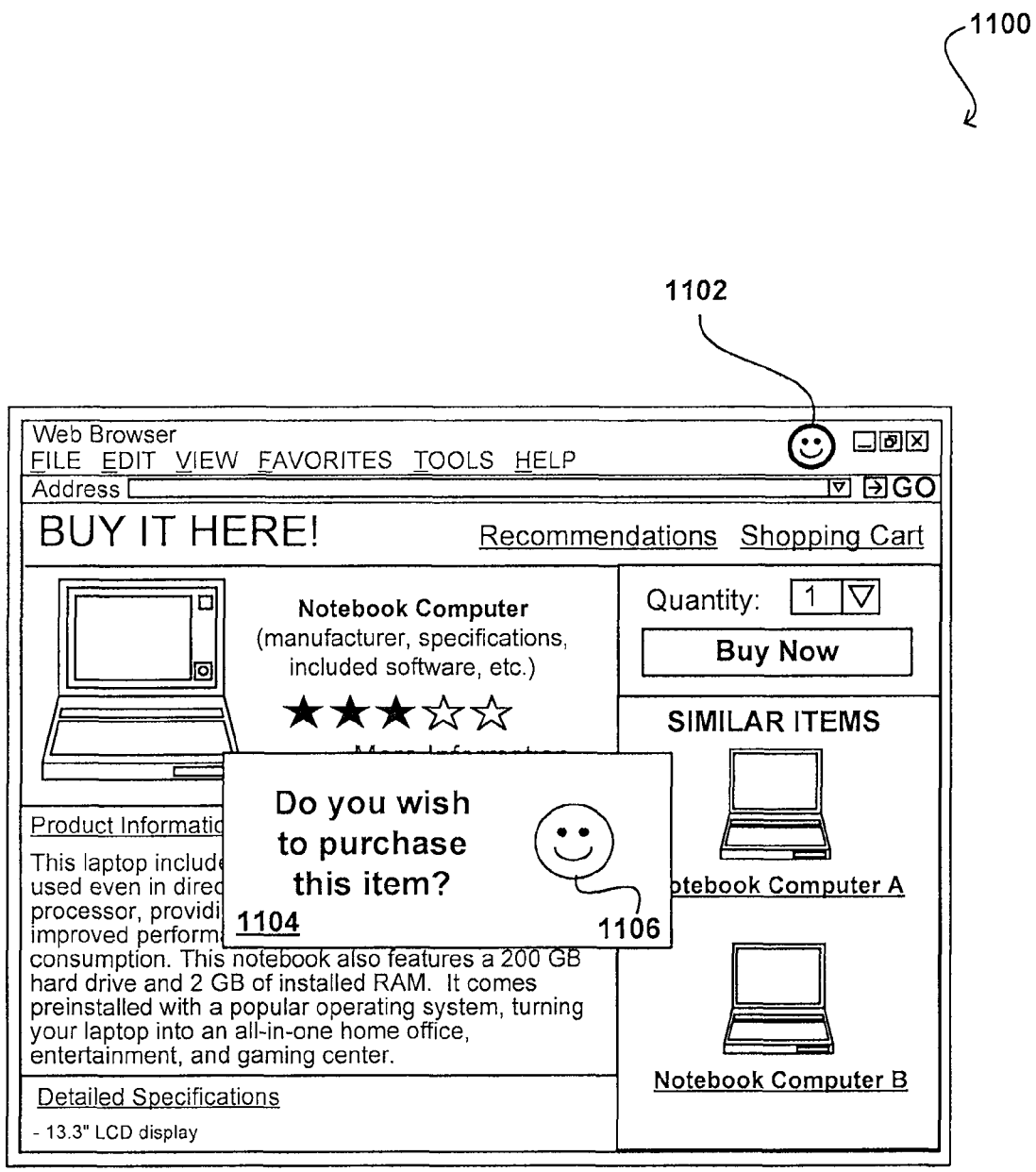
FIG. 11 illustrates an example of a display that can be generated to prompt a user to confirm an action corresponding to a relative movement in accordance with one embodiment.

FIG. 11 illustrates an example of an interface screen 1100 that could be displayed to a user on such a device. In this example, a display page for an item being offered for sale via an electronic marketplace is provided to the user via a Web page displayed in a Web browser on the user device. It should be understood that this is merely an example, and that any of a number of application pages, Web pages, documents, gaming screens, or other such displays or interfaces can be used with input methods described herein. In this example, the display includes an icon 1102 indicating that facial recognition control is active. While a graphical icon is used in this example, any of a number of approaches can be used in various embodiments to indicate to a user that a facial and/or motion control mode is activated. Here, the icon 1102 is displayed to the user when the facial recognition control mode is activated, and is hidden or "crossed out" when the mode is not activated. In some embodiments, the icon will have different states. For example, the icon might appear gray when the mode is active, and will turn "green" or smile or perform some other action when the user's face is detected. Where there are multiple users with accounts or information on the device, the facial recognition icon might turn to a color or display an image corresponding to the current user, indicating that the device is able to identify the user viewing the device. In this way, a user viewing the display on the device can know not only that the facial recognition mode is active, but that the device is currently detecting the user's face and/or identity such that the input motions will be recognized appropriately. As discussed, the input detection system can be enabled and/or engaged using any appropriate input mechanism, such as by a user selecting an input switch, using a voice command, selecting a user-selectable element of a display or interface, or providing a visual cue that can be detected by an imaging element of the device.

In this display, it is seen that the user is able to select an option to purchase the item being displayed. In some devices, the user can have the option of indicating desire to purchase the item using a conventional approach, such as by touching the item on the display or entering the selection via a keypad or other such entry mechanism. If a mode such as facial recognition mode is active, and the user's face is detected, then the user also can have the option of indicating a desire to purchase the item by performing an action such as nodding the user's head up and down. Depending on the application, user preferences, or other such information, the marketplace might simply accept the purchase via the nod, such that the user does not have to perform any other action, such as inputting payment or shipping information. In some embodiments, a confirmation panel 1104 or other such display element can be displayed asking the user to confirm whether the user intended to purchase the item. It should be understood that such display elements can be used to confirm any such facial or motion input. The confirmation element also can include another icon 1106, such as a facial icon indicating that the user can confirm via facial or device motion. In some embodiments, this icon might be animated to first nod up and down while smiling to indicate that the user should nod up and down to confirm the purchase, and might be animated to turn the head side to side while frowning to indicate that the user should turn his or her head in a "no" motion to cancel the purchase. Any other appropriate action can be displayed or used to confirm, etc. If the user nods "yes" to confirm, then the interface can accept the purchase and cause the transaction to be confirmed using any of a number of approaches known in the art for performing such functions. As discussed, such input approaches can be used for any appropriate application, process, etc., which accepts user input for such purposes.

In some embodiments, a confirmation process takes advantage of the obtained image information to analyze biometric information such as facial recognition, retinal scanning, or other such processes capable of verifying the identity of a user. In other embodiments, a user can create a motion-based "password," such as a series of motions that must be performed by the user to confirm an action such as a purchase. For example, the user could set a password to three nods up and down, followed by a smile and two eyebrow raises, or any other appropriate combination of motions and/or actions that are associated with that user.

A user can also provide other types of feedback regardless of whether a confirmation or similar panel or element is displayed. For example, a user submitting a search query can receive a number of search results. The user can have the ability to provide feedback (e.g. input) such as by turning the user's head from side to side in a "no" motion to indicate that the desired results are not included on the presently displayed search results. Similarly, in an example where a user is shopping using an electronic marketplace, the user can provide input such as by forming a smile when the items displayed are of interest to the user, which can cause actions to occur such as similar items being displayed, while a frown can indicate undesired results. Such input can be stored and/or tracked for a user and used for purposes such as suggesting or recommending items that might be of interest to the user.

Figure 12A:
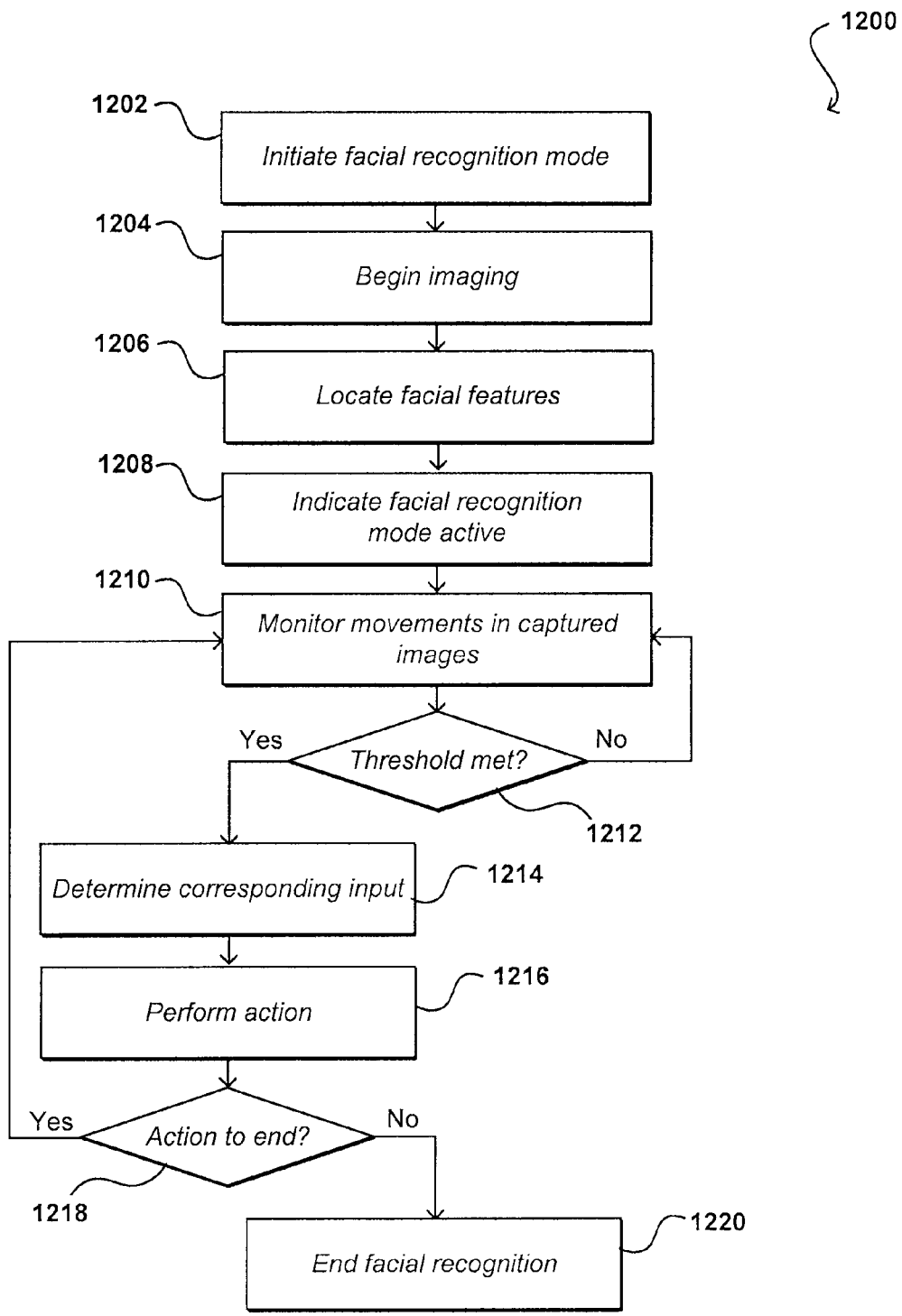
FIGS. 12(a)-12(b) illustrate approaches to processing relative movement as input in accordance with one embodiment.

Taking advantage of at least some of these mechanisms, FIG. 12(*a*) illustrates an example process 1200 in accordance with one embodiment for accepting facial recognition-based input from a user. In this process, the facial recognition mode is activated 1202 using approaches such as those discussed herein. An imaging element of the device begins to capture images of the viewable area of the element 1204, and the images are analyzed to locate the desired facial features of the user 1206. In some cases, this process might require analyzing a stream of images to locate features such as the eyes of the user, and that the determined location be relatively consistent for a period of time. This initial location process might require the user to remain relatively still for a period of time. Once the facial features of the user are located within an acceptable degree of certainty, such as without varying by position more than 10% between images over a set of ten consecutive images or a period of two seconds, an indication can be generated to convey to the user that the facial features have been determined and that the user can now control the device using the desired facial motion(s) 1208. As discussed, this can include displaying an icon or other visual indication that the feature is active and ready for input, while in other embodiments this can take the form of an audio signal such as a "beep" or other tone confirming that the feature is active and ready. As should be apparent, a similar visual or audio approach can be used to inform the user when the user's face can no longer be detected or the feature is otherwise unavailable for any reason. Once the feature is activated, the position of the user's facial features in the captured images can be continually (or at least periodically) monitored 1210. The device can have at least one type of threshold set that specifies the amount of motion necessary for movement to be registered as input. For example, a user viewing a monitor likely will move his or her head depending upon the area of the screen being viewed. For example, a user sitting 2.5 feet away from a monitor that is 1.5 feet wide might have to turn his or her head more than twenty degrees in either direction before registering as input (as opposed to simply looking at the edge of the display). In order to avoid the need for such large motions, the device can instead (or in addition) determine a rate of movement. For example, a user might turn his or her head to the edge of the screen over the course of a second when reading or browsing, but might be able to shake his or her head to the right and left both within a second to indicate a desired input. Thus, an algorithm can take into account not only the range of motion, but the rate at which that motion occurs. As discussed later herein, such settings can be adjusted by a user for the particular device, user preferences, etc.

As the images are captured, each image (or every other image, etc.) can be analyzed to determine whether any of the motion thresholds are met or exceeded 1212. For example, facial position data can be determined for each image and compared with a number of previous images to determine if any movement met or exceeded a given threshold. A given amount of such data can be kept in local memory or cached for easy access and quick analysis. An algorithm might be used that analyzes for a first movement threshold in an up and down direction, a second threshold in a right/left direction, and a third threshold in a rotational direction, etc. If none of the position data meets or exceeds any thresholds, the monitoring process simply continues. If at least one of the movements meets or exceeds a respective threshold, then the corresponding action is determined for that input 1214 and that action is performed 1216. It should be understood that the action can also require another input from the user, such as a confirmation action, etc. If the action is to end the process, power off the device, or otherwise end the monitoring 1218, the process ends 1220. Otherwise, monitoring continues for the user device.

In some embodiments, the computing device uses the orientation detection element 210 to determine whether the computing device has moved. When it is determined that the computing device has moved, the computing device can use this determination to trigger the capture of another image of the user using imaging element 208. This subsequent image can then be used to determine the change in relative location of the user with respect to the device. In some embodiments, the imaging information is combined with the information collected by the orientation detection element.

In some embodiments, the algorithm and/or process can utilize at least one learning aspect for received input. For example, if a user assigns a motion or expression to an input, the device can ask the user to perform and/or repeat the action in order to ensure that the device can properly detect and/or interpret the input. In another example, if a motion is detected that the device cannot properly interpret, the user might be asked to perform the motion again (more clearly) in an attempt to interpret the motion. If the device still cannot interpret the motion, the device can ask the user to select the input that the user is trying to provide, and ask the user to perform the corresponding motion such that the device can record or "learn" how the user performs that motion. In another example, the device can "learn" how a user performs a motion over time. For example, if a user performs an action that is properly detected by the computer, but the action performed is near the edge of the detection threshold, the device can adjust the threshold for that motion or update information corresponding to the motion such that the device can better interpret the input for that particular user.

Figure 12B:
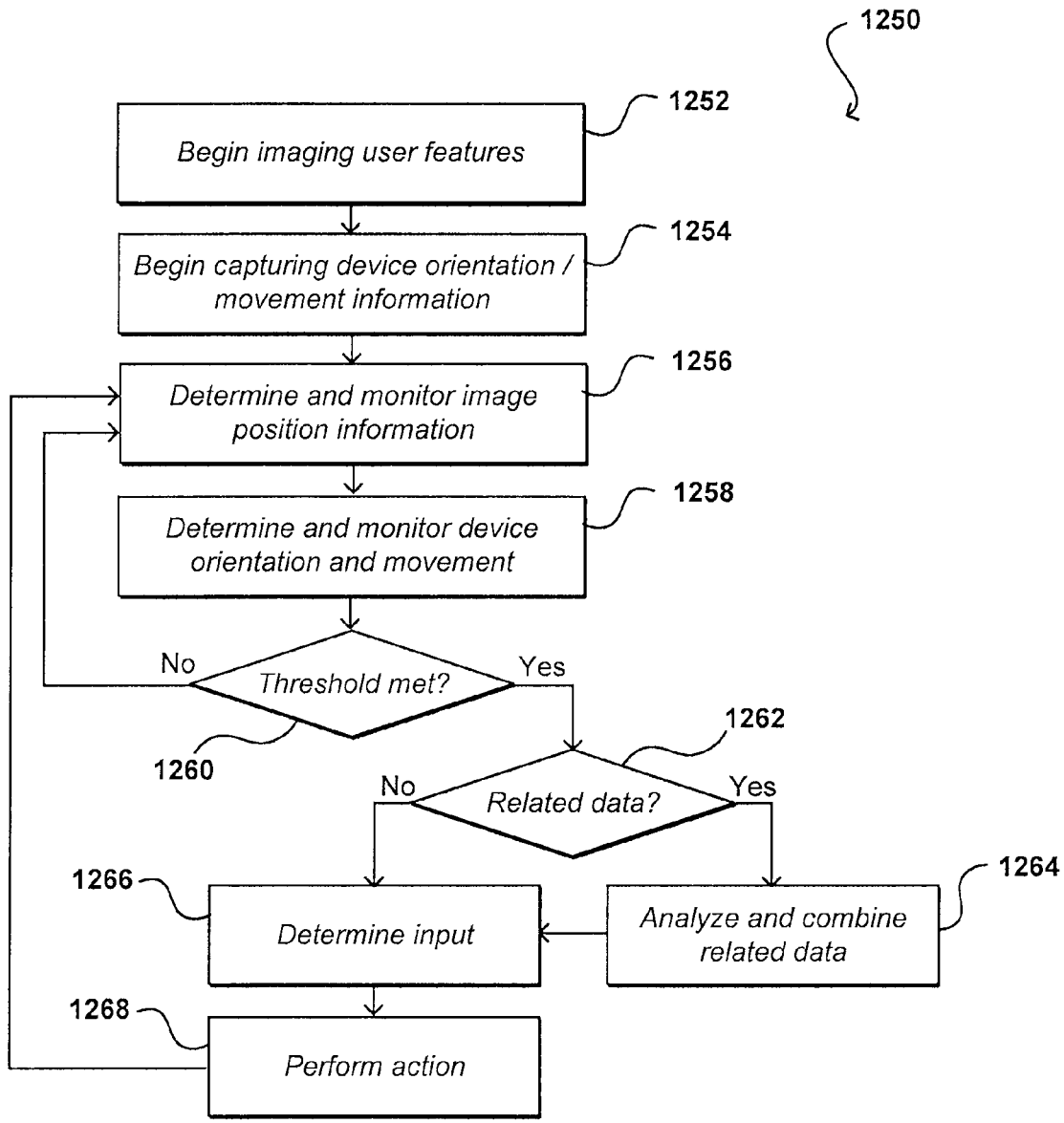

FIG. 12(b) illustrates an example of a process 1250 that further utilizes at least one motion or orientation detection element in addition to facial feature recognition. This example does not include various steps above, such as activating the mode, etc., but it should be understood that such steps also can apply to this and other processes. Further, the ordering and selection of steps can vary in different embodiments. In this process, images of the user's features are captured and analyzed 1252. At least one of orientation, movement, and acceleration information for the device is detected using at least one appropriate element discussed herein 1254. Each image is monitored (e.g., analyzed and compared to previous image position information) to determine whether any of the image thresholds are met or exceeded 1256. The position, acceleration, and/or movement of the device is also monitored to determine whether any of the motion or orientation thresholds are met or exceeded 1258. In some cases, the information might be analyzed together where complex motions or multiple types of data are needed for an input decision. If none of the thresholds are met or exceeded 1260, the monitoring continues. If at least one threshold is met or exceeded, a determination can be made as to whether related data is needed 1262. For example, if it is detected that the facial features moved up and down by a threshold amount, it might also be necessary to analyze the orientation information to determine whether the threshold was met by moving the device up and down, rotating the device, or occurred while the device was relatively stationary. If so, the related data is analyzed and combined with the data that met or exceeded the threshold 1264. Using the data, the appropriate action or function is determined for the respective input 1266, and that action or function is performed or executed 1268. As discussed above, the process can continue until an input or action is received that ends the monitoring process, etc.

While a process such as that described with respect to FIG. 12(b) can be particularly advantageous for devices such as small portable devices, devices such as desktop computers that are not portable can potentially benefit as well. In some embodiments, a slightly different approach than described above may be more advantageous. For example, when a device is being held in a user's hand, some compensation may be needed for inadvertent movement due to the nature of a handheld device. For example, a user may regularly move the device by small amounts without any intent with respect to input. Such movement can be addressed by a motion adjustment algorithm, as known in the art, but still introduces some level of uncertainty that can be taken into account. Thus, it can be difficult to accurately register and track small movements for input. Further, portable devices in general do not have the resolution or processing power of desktop computers or other such devices. Approaches in accordance with various embodiments thus can take advantage of this additional power and capability to provide further control options for a user.

Figure 13:
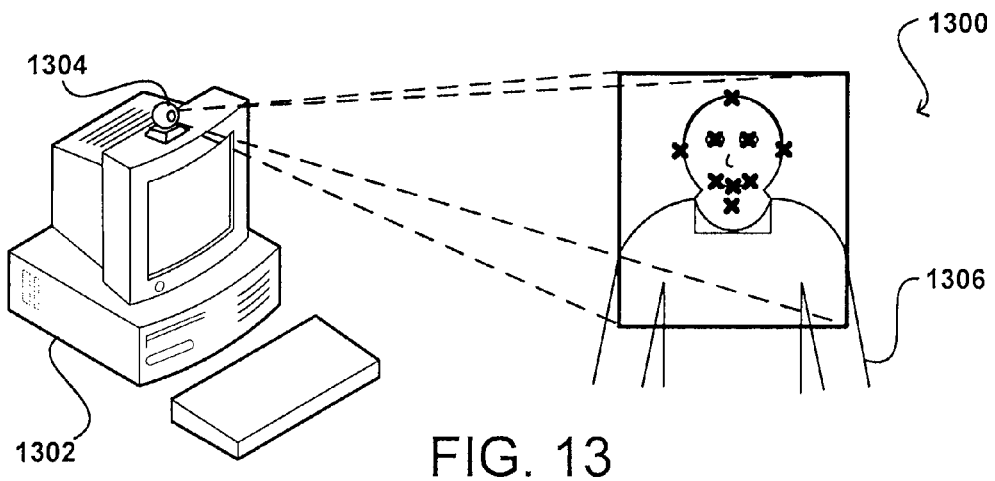
FIG. 13 illustrates an example of a camera imaging the facial region of a user in accordance with one embodiment.

As illustrated in FIG. 13, a user might utilize a desktop computer 1302 and camera 1304 that generally is fixed in position. Accordingly, there may be little use for including an accelerometer or other such orientation detection element in the primarily stationary system 1300. Since the user is typically seated when operating such a stationary system, there will generally be less unintended or meaningless variation in position than for a portable device. Further, a camera 1304 for such a device may be of a higher resolution and can operate at a higher capture frequency than imaging elements in portable devices. Thus, it is possible in such a system to detect more subtle movements on behalf of the user, which can allow for additional types of inputs via motion or expressions of the user. For example, as seen in FIG. 13 the camera is not only able to detect the position of the eyes and head of the user 1306, but also is able to locate a number of positions along the mouth of the user. Various other features of the user can be identified as well. Because multiple points corresponding to a feature can be determined, instead of simply a single estimate of position, a user can provide input not only through positional means but also through expressions or other such movements.

Figures 14A, 14B:
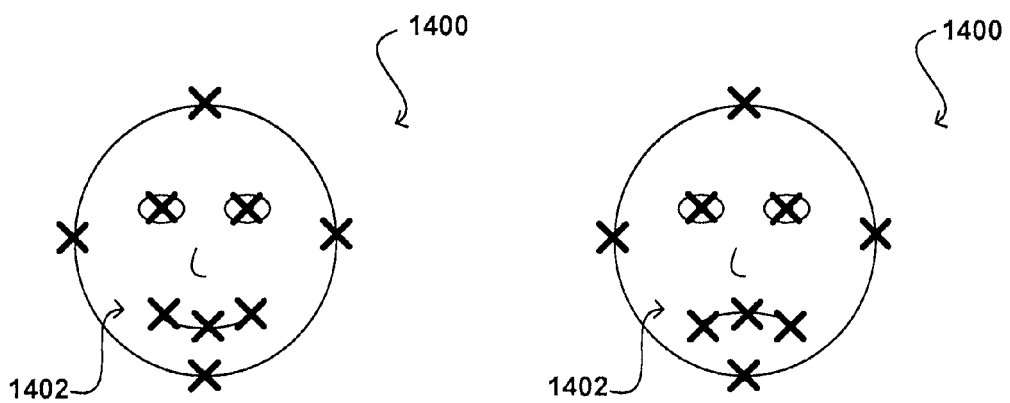
FIGS. 14(a)-14(b) illustrate an example of a method for detecting facial movement that can be used in accordance with one embodiment.

For example, as can be seen in the exaggerated illustration of FIG. 14(a), when a user 1400 smiles the detected points 1402 along the user's mouth will include end points that are noticeably higher (in the captured image) than the center portion of the user's mouth. As shown in FIG. 14(b), when the same user 1400 frowns the center portion will be higher than the end points of the user's mouth. While people's mouths do not generally move in such a simple motion, it can be seen that positions of a feature can change, and these positions can be captured and used as input. For example, a user might be able to raise an eyebrow or blink twice, which could be captured as input. A user also could be able to make certain shapes with his or her mouth, which can be captured as input. As should be apparent, any motion or expression that can be captured, determined, and/or recognized as an intended input can be used in such an approach.

Figures 15A, 15B, 15C:
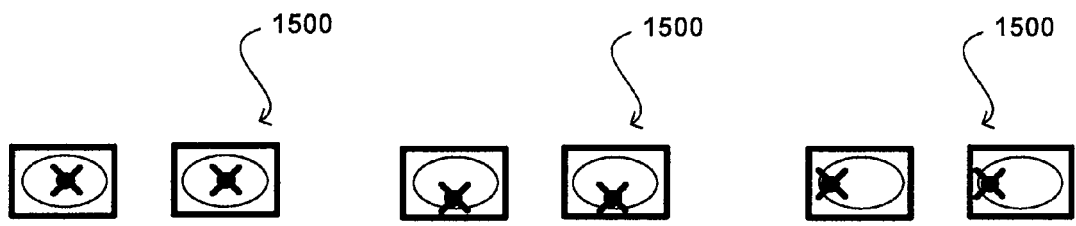
FIGS. 15(a)-15(c) illustrate an example of capturing eye movement of a user as input in accordance with one embodiment.

Further, an approach in accordance with one embodiment also can follow the eyes of a user. For example, FIG. 15(a) illustrates an example wherein images are captured and analyzed to determine the position of the user's eyes 1500. In a system wherein the algorithm is able to differentiate the user's pupils, the system can also utilize the relative position of the pupils with respect to the eye position. For example, FIG. 15(b) illustrates a case where the user is looking "down". As can be seen, the positions of the pupils have moved below a center point of the eyes. Similarly, FIG. 15(c) illustrates a case where the user is looking "left" (or to the user's right"), such that a center point of each user's pupil is to the left (in the image) of the center point of the respective eye. A system in accordance with one embodiment can take advantage of such information by adjusting the display of the computing device according to the detected position of the user's pupils relative to the user's eyes, and thus the determined area on the display at which the user is looking. A system can also detect movements such as a user closing his or her eyes for an extended period of time, wherein the device can perform an action such as placing an electronic book reader in a "sleep" or power-limiting mode, deactivating image capture, or powering off the device.

In one embodiment, a user calibrates a device by looking at each of a number of targets on a screen, such as at each corner, whereby the device can detect relative positions of the pupils to the eyes of the user for different locations on the display. Thus, when a user looks to a certain portion of the display, the device can act accordingly. For example, if a user is reading an electronic book, the device can automatically scroll the page up, or turn to the next page, when the user gets to the bottom of the current page. In another example, a user can select from a number of elements on the display simply by looking at that element. For example, a user might submit a search query and receive a list of search results. A user can view the results, and if one of the results is of interest to that user, the user can submit input while looking at that item. For example, a user can look at the fourth item on the list and perform an action such as blinking twice or saying the word "open" and the device can determine to open a document corresponding to the element at which the user is looking. A user looking at a specific area of interest also can cause the display to zoom into that area and the surrounding area (any number of times) until a specific area of interest is identified. In some cases, a user might look at a position on the display and say "zoom" or perform a detectable motion such as nodding forward. In another example, if there are multiple levels to a display, or if there are multiple "zoom" levels, the display can automatically zoom in or out depending on where the user is looking, as long as the user looks for a sufficient period of time. For example, if a user is looking at a map and looks at a particular state, after a few seconds the display might zoom in to show that particular state (and maybe surrounding states). If the user looks to another state while zoomed in, the display can either shift to that state or zoom out whereby the user can select another state. A display also can have icons or elements corresponding to zoom commands, such that a user wanting to zoom in can look at a "zoom in" element and may also look at the specific area at which the user wants to zoom. The display can take these inputs and zoom at the desired location.

Figure 16:
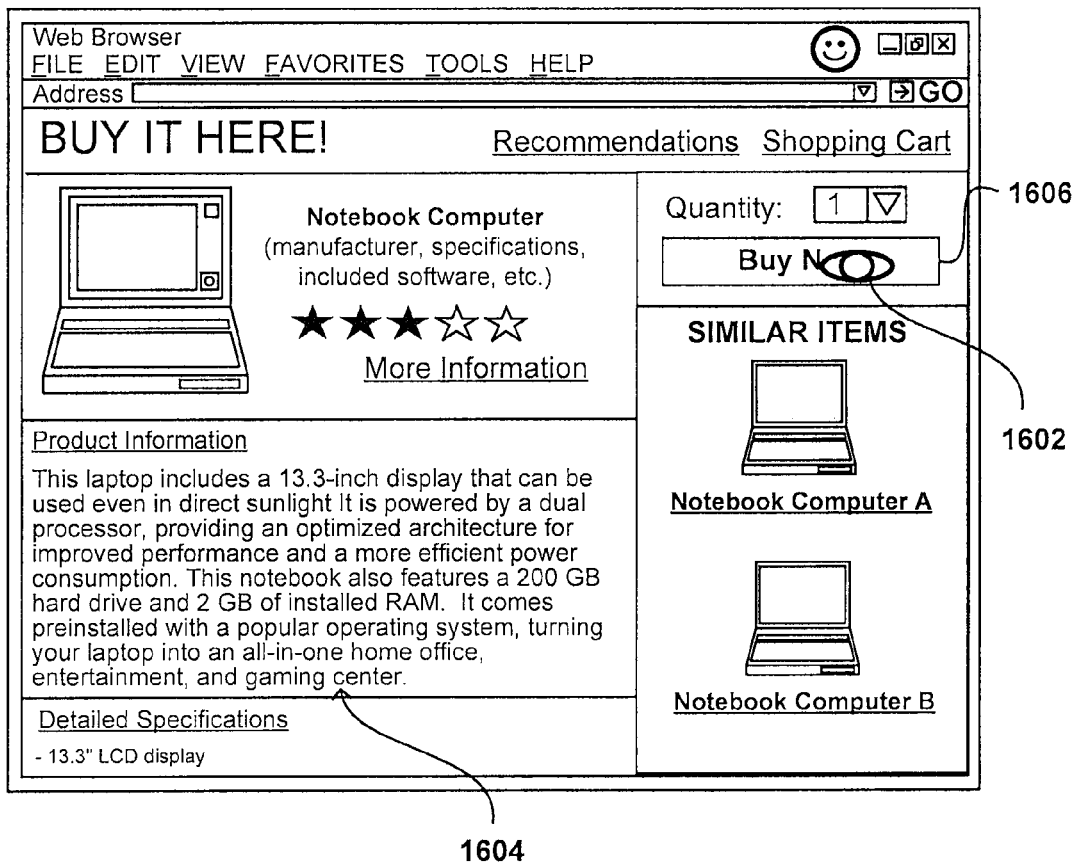
FIG. 16 illustrates an example of a display that can be used with the eye-movement approach of FIGS. 15(a)-15(c)

FIG. 16 illustrates an example of a display 1600 that can be used with an approach such as that described above with respect to FIGS. 15(a)-15(c). As discussed, the approach can determine the position on a screen at which the user is looking. In this display, an icon 1602 such as a moving eye can be displayed that corresponds to the detected position at which a user is looking. Because the user will typically want to see what is at that position, the icon can be displayed using any of a number of approaches. In a first approach, the icon is a very faint icon that allows a user to see what is behind the icon while still knowing the position of the icon. In another embodiment, the icon is only visible when the user performs a quick eye movement, such as by looking up at the top of the display, but is not displayed during slow movements such as when a user is reading text. In another example, the icon is only displayed when the user is looking at a selectable element. For example, the icon might not be displayed when it is determined the user is looking at an area of text 1604, but might only be displayed when the user is looking at a selectable element 1606. Thus, a user browsing an item on a display page might not see the icon when looking at the information for the item, but might see the icon when the user is looking at a "buy now" or similar button such that the user knows what will happen if the user performs a certain action. Such an icon can be useful where there are multiple selectable elements on a page, and the user wants to be sure which element will be selected and what action will be taken if the user provides visual input. For example, a user might blink twice as a "select" command, but it could be desirable for the icon to appear corresponding to where the user is looking so that the user knows the blink will select the appropriate element.

Figure 17:
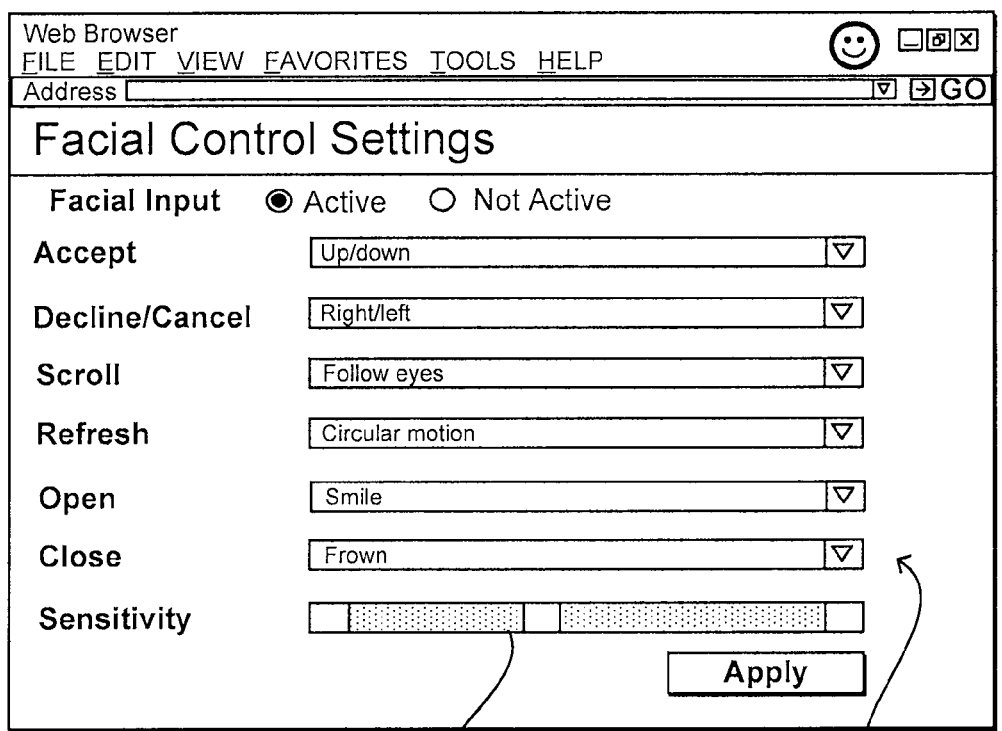
FIG. 17 illustrates an example of a display that can be presented to a user to customize the input control approaches in accordance with one embodiment.

As there can be any of a number of different expressions or movements used for input, and as users will have different preferences as to the preferred expressions to be used, an application in accordance with one embodiment can allow a user to select or specify which actions will correspond to certain inputs. For example, FIG. 17 illustrates an example of a display 1700 that can be presented to a user to allow the user to specify actions to be used for various inputs. In this example, there are a number of example inputs shown 1702, such as "accept," "decline," "scroll," etc. For each of these, a drop down list is provided that allows a user to select an expression or relative movement to be used for each action. It should be understood that these selections and mechanisms are merely examples, and that any of a number of actions can be specified using any of a number of user-selectable elements. If a user does not want an action to have a corresponding motion, then the user can leave the action blank, select an option such as "none," or any other appropriate action. As shown, the user also can have the option 1704 to adjust the sensitivity of the motions, here by adjusting a slider bar. Such an approach allows the user to effectively adjust the thresholds for determining input. There can be an overall sensitivity or similar control, or there can be specific settings for specific actions. In some embodiments, a user calibrates each action (e.g., by performing the action at the request of the system) so the system can better ensure proper detection. A sensitivity or similar adjustment can help for various factors, such as how far a user sits from the camera, how much expression the user has, the size of the user, etc. Further, a user might use different devices and the settings might need to be different for each device (e.g., the operating distance for a PDA will typically be different from the operating distance for a desktop computer). Such a screen can allow a user to specify combinations of actions, such as movement of a device, facial expressions, head movements, etc. A user also can specify (e.g. define) new actions, movements, and/or combinations in various embodiments. These can be similar to "macros" as known for interfaces, where a user can define a series of movements or expressions to correspond to one or more inputs or actions. As can be seen, the interface also allows a user to activate or deactivate motion input, although other input approaches such as pressing buttons on the device or using voice recognition can be used as well.

Further, different users can be set up on the same device, and each user can select different inputs and options. In one embodiment, such as described above, a device can determine facial feature relational positions such that the device can distinguish between relative users. Thus, when a first user performs an action relative to the device, the device can interpret that motion as a first input, and when a second user performs the same action, the device can recognize the second user, and automatically interpret the motion as a second input. Such an approach allows multiple users to be set up on the same device, and the system can recognize and distinguish between the various users. Thus, a user can view a page and purchase an item by simply performing a facial movement, for example, and the system can be set up to recognize the user and the action such that the single action by the user results in a purchase of that item for that user.

Figure 18:
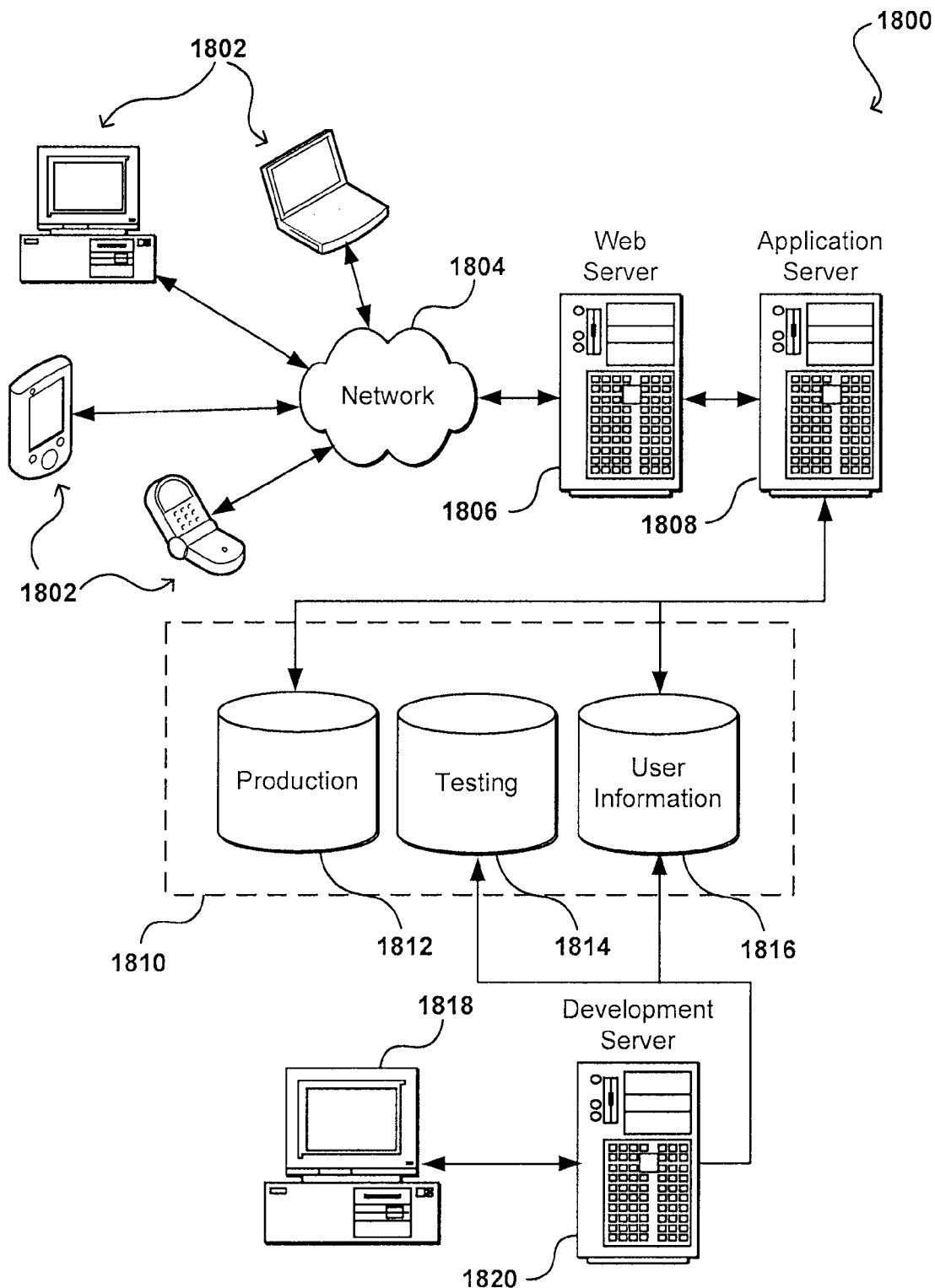
FIG. 18 illustrates an environment in which various embodiments can be implemented.

As discussed, various approaches can be implemented in various environments for various applications. For example, FIG. 18 illustrates an example of an environment 1800 for implementing aspects in accordance with various embodiments. As will be appreciated, although a Web-based environment is used for purposes of explanation, different environments may be used, as appropriate, to implement various embodiments. The environment 1800 shown includes both a testing or a development portion (or side) and a production portion. The production portion includes an electronic client device 1802, which can include any appropriate device operable to send and receive requests, messages, or information over an appropriate network 1804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 1806 for receiving requests and serving content in response thereto, although for other networks an alternative device serving a similar purpose could be used as would be apparent to one of ordinary skill in the art.

The illustrative environment includes at least one application server 1808 and a data store 1810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 1802 and the application server 1808, can be handled by the Web server. It should be understood that the Web and application servers are not required and are merely example components, as structured code discussed herein can be executed on any appropriate device or host machine as discussed elsewhere herein. Further, the environment can be architected in such a way that a test automation framework can be provided as a service to which a user or application can subscribe. A test automation framework can be provided as an implementation of any of the various testing patterns discussed herein, although various other implementations can be used as well, as discussed or suggested herein.

The environment also includes a development and/or testing side, which includes a user device 1818 allowing a user such as a developer, data administrator, or tester to access the system. The user device 1818 can be any appropriate device or machine, such as is described above with respect to the client device 1802. The environment also includes a development server 1820, which functions similar to the application server 1808 but typically runs code during development and testing before the code is deployed and executed on the production side and is accessible to outside users, for example. In some embodiments, an application server can function as a development server, and separate production and testing storage may not be used.

The data store 1810 can include several separate data tables, databases, or other data storage mechanisms and media for storing data relating to a particular aspect. For example, the data store illustrated includes mechanisms for storing production data 1812 and user information 1816, which can be used to serve content for the production side. The data store also is shown to include a mechanism for storing testing data 1814, which can be used with the user information for the testing side. It should be understood that there can be many other aspects that may need to be stored in the data store, such as for page image information and access right information, which can be stored in any of the above listed mechanisms as appropriate or in additional mechanisms in the data store 1810. The data store 1810 is operable, through logic associated therewith, to receive instructions from the application server 1808 or development server 1820, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 1802. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 18. Thus, the depiction of the system 1800 in FIG. 18 should be taken as being illustrative in nature, and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of providing input to a virtual keyboard displayed on a portable computing device, comprising:
   obtaining a first image using an imaging element of the portable computing device, the first image including a facial feature of a user of the portable computing device;
   obtaining a second image using the imaging element, the second image including the facial feature of the user of the portable computing device;
   analyzing the obtained first image and second image, with the portable computing device, to determine a change in the position of the facial feature of the user with respect to the portable computing device;
   using the determined change, of the position of the facial feature with respect to the portable computing device, as input to perform a selection of one of a plurality of alphanumeric characters of the virtual keyboard, the selection corresponding to a position of a cursor configured to move in at least two degrees of freedom with respect to the virtual keyboard;
   altering information displayed within a graphical user interface including the virtual keyboard based at least in part on the determined change;
   in response to the selection, reducing a movement capability of the cursor with respect to the virtual keyboard by one degree of freedom such that the cursor is limited to being positioned with respect to a subset of the plurality of alphanumeric characters of the virtual keyboard corresponding to the reduced movement capability, the information displayed within the graphical user interface excluding a representation of either or both of the obtained first and second images;
   determining a subsequent change of the position of the facial feature with respect to the portable computing device, wherein the subsequent change, of the position of the facial feature with respect to the portable computing device, corresponds to the one degree of freedom by which the movement capability of the cursor is reduced;
   preventing use of data for the subsequent change, corresponding to the one degree of freedom, as input for performing a second selection using the cursor while the movement capability of the cursor is reduced;

determining an additional change of the position of the facial feature with respect to the portable computing device after the selection is performed, wherein the additional change, of the position of the facial feature with respect to the portable computing device, is outside the one degree of freedom by which the movement capability of the cursor is reduced; and utilizing data for the additional change as input for performing the second selection using the cursor while the movement capability of the cursor is reduced by the one degree of freedom.

2. The method according to claim 1, wherein:
obtaining the second image is in response to a movement of the portable computing device.

3. The method according to claim 1, further comprising:
analyzing the obtained first and second images to determine a change in a set of measurable aspects corresponding to facial features of the user of the computing device,
wherein altering the information displayed within the graphical user interface is based at least in part on the determined change of the set of measurable aspects.

4. The method according to claim 3, wherein the set of measurable aspects includes at least one of a dimension of at least one of the user's eyes, a separation of features on the user's face, a relative location of a feature on the user's face, and a relative orientation between features on the user's face.

5. The method according to claim 1, wherein:
analyzing the obtained first image and second image to determine a change in the position of the facial feature of the user with respect to the portable computing device includes determining a change in relative orientation between the user and the portable computing device.

6. The method according to claim 1, further comprising:
obtaining a third image using the imaging element, the third image including the facial feature of the user of the portable computing device;
analyzing the obtained second image and third image, with the portable computing device, to determine a second change in the position of the facial feature of the user with respect to the portable computing device, the second change based at least in part on an expression of the user adjusting at least one of a shape, position, and dimension of the facial feature of the user; and
altering the information displayed within the graphical user interface based at least in part on the second change.

7. The method according to claim 1, wherein:
altering the information displayed within the graphical user interface includes moving the cursor over the virtual keyboard in a direction corresponding to the reduced movement capability.

8. A method for selecting an alphanumeric character in a computing device, comprising:
analyzing first image information of a user of the computing device, the first image information obtained using an imaging element of the computing device, to detect a first position of the computing device at a first distance from the user;
in response to detecting the first position of the computing device at a first distance from the user, identifying a first alphanumeric character of a virtual keyboard available for selection;
receiving a selection of the first alphanumeric character;
in response to receiving the selection, reducing the movement capability of a cursor displayed on the computing device by one degree of freedom with respect to the virtual keyboard, the cursor being configured to move in at least two degrees of freedom with respect to the virtual keyboard before receiving the selection;

determining a subsequent change in at least one of a position of the computing device with respect to the user or a distance from the user at which the computing device is, wherein the subsequent change, in the at least one of the position of the computing device with respect to the user or the distance from the user at which the computing device is, corresponds to the one degree of freedom by which the movement capability of the cursor is reduced;

preventing use of data for the subsequent change, corresponding to the one degree of freedom, as input for performing a selection using the cursor while the movement capability of the cursor is reduced;

analyzing second image information of the user of the computing device, the second image information obtained using the imaging element of the computing device, to detect a second position of the computing device at a second distance from the user, wherein the second position indicates an additional change of the position of the user with respect to the computing device after receiving the selection; and in response to detecting the second position of the computing device at a second distance from the user, utilizing the additional change of the position of the user with respect to the computing device to identify a second alphanumeric character of the virtual keyboard available for selection.

9. The method according to claim 8, further comprising:
displaying a set of characters of the virtual keyboard using a display element of the computing device; and
at a time when the cursor is in a position to select at least one character in the set of characters, performing the step of receiving the selection of the at least one character.

10. The method according to claim 9, further comprising:
segmenting the set of characters of the virtual keyboard into a plurality of subsets of characters, wherein the selection of at least one character in the set of characters comprises receiving a selection of at least one of the subsets of characters; and
segmenting the selection of the at least one subset of characters into a second plurality of subsets of characters.

11. The method according to claim 8, further comprising:
using an orientation detection element of the computing device in conjunction with analyzing the image information to determine the first position of the computing device;
wherein the cursor is configured to be directed toward the at least one character to be selected according to the first position of the computing device.

12. The method according to claim 11, wherein the orientation detection element is at least one of an accelerometer, a motion detector, an electronic compass, a global-positioning system receiver, and an electronic level.

13. The method according to claim 8, wherein reducing the movement capability of the cursor by one degree of freedom reduces the degrees of freedom from two degrees to one degree.

14. The method according to claim 8 further comprising:
in response to detecting a change in the orientation of the computing device, identifying a third alphanumeric character of the virtual keyboard available for selection, wherein the change in orientation corresponds to the user tilting the computing device.

15. The method according to claim 8, wherein:
identifying the first alphanumeric character available for selection includes at least one of:
hovering the cursor over the first alphanumeric character;
changing a color of the first alphanumeric character;
changing a shape of the first alphanumeric character;
changing a background color around the first alphanumeric character; and
displaying a shape around the first alphanumeric character.

16. A method of interacting with a computing device, comprising:
analyzing image information obtained using an imaging element of the computing device to determine a first relative orientation of at least one feature of a user to the computing device;
analyzing device orientation information obtained using an orientation detection element of the computing device to determine a second relative orientation of the computing device with respect to a surrounding environment;
detecting a change in at least one of the first and second relative orientations;
in response to detecting the change, performing a desired function corresponding to a position of a cursor configured to move in at least two degrees of freedom with respect to a menu rendered on a display of the computing device;
in response to performing the desired function, reducing a movement capability of the cursor by one degree of freedom with respect to the menu;
determining a subsequent change in a relative orientation of the computing device, the subsequent change in the relative orientation corresponding to the one degree of freedom by which the movement capability of the cursor is reduced;
preventing use of data for the subsequent change, corresponding to the one degree of freedom, as input for performing a selection using the cursor while the movement capability of the cursor is reduced;
determining an additional change in a relative orientation of the computing device outside the one degree of freedom by which the movement capability of the cursor is reduced; and
utilizing data for the additional change as input for performing the selection using the cursor while the movement capability of the cursor is reduced by the one degree of freedom.

17. The method according to claim 16, wherein:
analyzing image information includes capturing at least one image from the portable computing device to determine the position of the at least one feature of a user with respect to the computing device, and
detecting a change in at least one of position of the at least one feature of the user and the orientation of the computing device includes capturing at least one additional image from the portable computing device and determining a difference in position of the at least one feature.

18. The method according to claim 16, wherein:
the step of performing a desired function for the detected change includes altering the information displayed within a graphical user interface based at least in part on the detected change, wherein the graphical user interface of the device excludes a representation of the image information.

19. The method according to claim 16, further comprising:
determining whether the detected change at least meets an input threshold corresponding to the change before determining the desired function.

20. The method according to claim 16, wherein:
the orientation detection element is one of an accelerometer, a motion detector, an electronic compass, and an electronic level.

21. The method according to claim 16, wherein:
the at least one feature corresponding to the user includes at least one facial feature of the user.

22. The method according to claim 16, wherein:
analyzing the image information to determine the first relative location of the at least one feature of the user to the computing device includes determining an approximate location of each eye of the user in the image information.

23. The method according to claim 16, wherein:
performing the desired function includes at least one of viewing and selecting an item.

24. The method according to claim 16, further comprising:
analyzing the image information to determine an identity of the user.

25. The method according to claim 24, further comprising:
determining a plurality of inputs corresponding to a plurality of changes for the determined identity of the user.

26. The method according to claim 24, further comprising:
capturing calibration information for each determined identity before analyzing the image information.

27. The method according to claim 16, further comprising:
prompting the user to confirm the desired function before performing the function.

28. The method according to claim 27, further comprising:
enabling the user to confirm the input by changing at least one of the first and second relative orientations.

29. A computing device, comprising:
a processor;
a display element for displaying a graphical user interface;
a memory device including instructions operable to be executed by the processor to perform a set of actions; and
an imaging element operable to obtain image information corresponding to a relative viewing area of the computing device,
the computing device being operable to:
obtain a first image and a second image using the imaging element, the first and second images each including a position of at least one of eyes, a mouth, and a head of a user of the computing device;
analyze the obtained first image and second image to determine a change in the positions of at least one of the eyes, the mouth, and the head of the user with respect to the computing device;
use the determined change as input to perform a selection of one of a plurality of alphanumeric characters displayed as part of a menu through the graphical user interface, the selection corresponding to a position of a cursor configured to move in at least two degrees of freedom with respect to the menu;
in response to the selection, reduce a movement capability of the cursor by one degree of freedom with respect to the menu such that the cursor is limited to being positioned with respect to a subset of the plurality of alphanumeric characters of the menu, the choices of the alphanumeric characters in the subset being limited by the reduced movement capability, the information displayed within the graphical user interface excluding a representation of the obtained first image, the obtained second image, or both the obtained first and second images;

determine a subsequent change in the positions of at least one of the eyes, the mouth, or the head of the user with respect to the computing device, wherein the subsequent change, in the positions of the at least one of the eyes, the mouth, or the head of the user with respect to the computing device, corresponds to the one degree of freedom by which the movement capability of the cursor is reduced;

prevent use of data for the subsequent change, corresponding to the one degree of freedom, as input for performing a selection using the cursor while the movement capability of the cursor is reduced;

determine an additional change in the positions of at least one of the eyes, the mouth, or the head of the user with respect to the computing device, wherein the additional change is outside the one degree of freedom by which the movement capability of the cursor is reduced; and utilize data for the additional change as input for performing the selection using the cursor while the movement capability of the cursor is reduced by the one degree of freedom.

30. A method of receiving input for a computing device, comprising:

analyzing image information to determine at least one relative location of at least one feature of a user with respect to the computing device, the image information being obtained using an imaging element of the computing device;

in response to detecting a change in the at least one relative location of at least one feature of the user that at least meets an input threshold corresponding to the change, selecting an input function corresponding to the detected change and executing the selected input function, the execution corresponding to a position of a cursor configured to move in at least two degrees of freedom with respect to a directory displayed on a display of the computing device;

in response to executing the selected input, reducing a movement capability of the cursor by one degree of freedom with respect to the directory, wherein the user is able to define the input function corresponding to the detected change;

determining a subsequent change in at least one relative location of at least one feature of the user with respect to the computing device, wherein the subsequent change, in the at least one relative location of the at least one feature of the user with respect to the computing device, corresponds to the one degree of freedom by which the movement capability of the cursor is reduced;

preventing use of data for the subsequent change, corresponding to the one degree of freedom, as input for performing a selection using the cursor while the movement capability of the cursor is reduced;

determining an additional change in at least one relative location of at least one feature of the user with respect to the computing device, wherein the additional change is outside the one degree of freedom by which the movement capability of the cursor is reduced; and utilizing data for the additional change as input for performing the selection using the cursor while the movement capability of the cursor is reduced by the one degree of freedom.

31. The method according to claim 30, wherein:
detecting the change in the at least one relative location of at least one feature of the user includes detecting a change in at least one facial feature of the user.

32. The method according to claim 31, wherein:
detecting the change in the at least one relative location of at least one feature of the user includes detecting a change in at least one of a plurality of relative locations for the at least one facial feature of the user, at least one facial feature of the user having a plurality of relative locations associated therewith such that a change in expression for that facial feature results in a change in at least one relative position of the facial feature.

33. The method according to claim 30, wherein:
selecting the input function corresponding to the detected change and executing the selected input function includes altering information displayed within a graphical user interface associated with the computing device based at least in part on the detected change, wherein the graphical user interface of the computing device excludes a representation of the image information.

34. A computing device, comprising:
a processor;
a display element;
an imaging element operable to capture image information, the imaging element being oriented such that a user viewing the display element will be at least partially captured in the image information; and
a memory device including instructions that, when executed by the processor, cause the processor to:
analyze the image information to determine a set of measurable aspects corresponding to facial features of the user of the computing device;
determine a relative orientation of the user with respect to the computing device based at least in part upon values for the set of measurable aspects;
determine a change in the relative orientation of the user with respect to the computing device, the change in orientation being based at least in part on a change in position of the computing device;
perform a function corresponding to the determined change in the relative orientation and corresponding to a position of a cursor configured to move in at least two degrees of freedom with respect to an arranged set of characters displayed on the display element;
in response to performing the function, reduce a movement capability of the cursor by one degree of freedom with respect to the arranged set of characters such that the user of the computing device is limited to defining a function to be performed in response to each of a plurality of determinable changes in the relative orientation;
determine a subsequent change in the relative orientation of the user with respect to the computing device, wherein the subsequent change, in the relative orientation of the user with respect to the computing device, corresponds to the one degree of freedom by which the movement capability of the cursor is reduced;
prevent use of data for the subsequent change, corresponding to the one degree of freedom, as input for performing a selection using the cursor while the movement capability of the cursor is reduced;
determine an additional change in the relative orientation of the user with respect to the computing device, wherein the additional change is outside the one degree of freedom by which the movement capability of the cursor is reduced; and utilizing data for the additional change as input for performing the selection using the cursor while the movement capability of the cursor is reduced by the one degree of freedom.

35. The computing device according to claim 34 wherein the memory device further includes instructions that, when executed by the processor, cause the processor to:

determine whether the change at least meets an input threshold corresponding to the change before performing the action.

36. The computing device according to claim 34, wherein: the step of performing the function includes altering the information displayed within a graphical user interface on the display element of the computing device based at least in part on the determined change, wherein the information displayed within the graphical user interface of the device excludes a representation of the image information.

37. A computer program product embedded in a non-transitory computer-readable medium for controlling a computing device, comprising:

program code for analyzing first image information of a user to determine a first position of the computing device, the first position being a first distance away from the user and the first image information being obtained using at least one imaging element of the computing device positioned such that a representation of the user of the computing device is at least partially included in the image information;

program code for determining, in response to detecting a change in the first position of the computing device at the first distance away from the user, whether the change at least meets an input threshold corresponding to the change;

program code for determining an input to perform a selection of one of a plurality of alphanumeric characters displayed as part of a window panel through the graphical user interface, the determined input corresponding to a detected change that at least meets the input threshold, and executing an action on the computing device in response to the determined input, wherein a movement capability of a cursor with respect to the window panel is reduced by one degree of freedom with respect to the window panel in response to executing the action;

program code for determining a subsequent change in the first position of the computing device at the first distance away from the user, wherein the subsequent change, in the first position of the computing device at the first distance away from the user, corresponds to the one degree of freedom by which the movement capability of the cursor is reduced;

program code for preventing use of data for the subsequent change, corresponding to the one degree of freedom, as input for performing a selection using the cursor while the movement capability of the cursor is reduced; and program code for analyzing second image information of the user to determine a second position of the computing device, the second position being a second distance away from the user and the second image information being obtained using at least one imaging element of the computing device, wherein the second position indicates an additional change of the position of the user with respect to the computing device, wherein the second position is further away from the user than the first position and the program code for executing the action on the computing device includes altering information displayed within a graphical user interface on a display element of the computing device based at least in part on the detected change and the additional change, the information displayed on the graphical user interface of the computing device excluding a representation of the user.

38. The computer program product according to claim 37, further comprising:

program code for determining an orientation of the portable computing device, the portable computing device including at least one element operable to determine the orientation; and program code for determining a change in the orientation of the computing device, wherein the program code for determining whether the change at least meets an input threshold corresponding to the change includes instructions for analyzing both changes in orientation and changes in relative location of at least one feature of the user.

39. The computer program product according to claim 38, wherein:

a user of the computing device is able to define an action to be executed in response to each of a plurality of detectable changes.

* * * * *